(12) United States Patent
Blauvelt et al.

(10) Patent No.: US 7,622,708 B2
(45) Date of Patent: Nov. 24, 2009

(54) OPTICAL ELEMENT FOR FREE-SPACE PROPAGATION BETWEEN AN OPTICAL WAVEGUIDE AND ANOTHER OPTICAL WAVEGUIDE, COMPONENT, OR DEVICE

(75) Inventors: Henry A. Blauvelt, San Marino, CA (US); Albert M. Benzoni, South Pasadena, CA (US); Rolf A. Wyss, Glendale, CA (US)

(73) Assignee: HOYA Corporation USA, San Jose, CA (US)

( * ) Notice: Subject to any disclaimer, the term of this patent is extended or adjusted under 35 U.S.C. 154(b) by 0 days.

(21) Appl. No.: 12/114,605

(22) Filed: May 2, 2008

(65) Prior Publication Data
US 2008/0272282 A1 Nov. 6, 2008

Related U.S. Application Data

(60) Provisional application No. 60/915,677, filed on May 2, 2007.

(51) Int. Cl.
*H01J 5/02* (2006.01)
(52) U.S. Cl. .................................. 250/239; 250/227.24
(58) Field of Classification Search ................. 250/239, 250/227.11, 227.14, 227.24, 227.29, 216; 385/38–49, 12–15
See application file for complete search history.

(56) References Cited

U.S. PATENT DOCUMENTS

| | | | |
|---|---|---|---|
| 4,707,064 A | 11/1987 | Dobrowolski et al. | |
| 4,750,799 A | 6/1988 | Kawachi et al. | |
| 4,969,712 A | 11/1990 | Westwood et al. | |
| 5,682,446 A | 10/1997 | Pan et al. | |
| 6,157,760 A * | 12/2000 | Fujita et al. | 385/49 |
| 6,324,314 B1 | 11/2001 | Ukechi et al. | |
| 7,031,575 B2 | 4/2006 | Blauvelt et al. | |
| 7,142,772 B2 | 11/2006 | Blauvelt et al. | |
| 7,366,379 B2 | 4/2008 | Blauvelt et al. | |
| 2002/0031307 A1 | 3/2002 | Kimura | |

(Continued)

OTHER PUBLICATIONS

Hashimoto et al, A 1.3/1.55-um Wavelength-Division Multiplexing Optical Module Using a Planar Lightwave Circuit for Full Duplex Operation, Journal of Lightwave Technology, Nov. 2000, pp. 1541-1547, vol. 18, No. 11.

(Continued)

*Primary Examiner*—Que T Le
(74) *Attorney, Agent, or Firm*—David S. Alavi

(57) ABSTRACT

An optical element comprises a substantially transparent material having opposing first and second transmission surfaces and a substantially flat mounting surface between them, an alignment mark, and an optical coating. The optical element is mounted self-supporting on a substrate with the mounting surface on a mating portion thereof. With the alignment mark aligned to a corresponding mark on the substrate, waveguides on the substrate can be end-coupled by reflection from the first transmission surface. The transmission and mounting surfaces are arranged to position the transmission surfaces at respective orientations relative to the substrate surface so that an optical beam propagating substantially parallel to the substrate surface and entering the optical element through the first transmission surface propagates as an optical beam through the optical element above the mounting surface and exits the optical element through the second transmission surface. The optical element can further include a lens or an aperture.

34 Claims, 21 Drawing Sheets

U.S. PATENT DOCUMENTS

| | | |
|---|---|---|
| 2002/0097962 A1 | 7/2002 | Yoshimura et al. |
| 2003/0021550 A1 | 1/2003 | Korenaga et al. |
| 2003/0235371 A1 | 12/2003 | Shimada et al. |
| 2004/0185594 A1 | 9/2004 | Nishihhara et al. |
| 2004/0218870 A1 | 11/2004 | Blauvelt et al. |
| 2006/0165373 A1 | 7/2006 | Blauvelt et al. |

OTHER PUBLICATIONS

Inoue et al, Filter-embedded wavelength-division multiplexer for hybrid-integrated transceiver based on silicabased PLC, Electronics Letters, Apr. 25, 1996, pp. 847-848, vol. 32, No. 9.

Kitagawa et al, Hybrid Integration Technologies Using Planar Lightwave Circuits and Developed Components, IEICE Trans. Electron., Apr. 2002, pp. 1009-1017, vol. E8, No. 4.

Nakagawa et al, High Power and High Sensitivity Planar Lightwave Circuit Module Incorporating a Novel Passive Alignment Procedure, Journal of Lightwave Technology, Jan. 1998, pp. 66-72, vol. 16, No. 1.

Okuda et al, Solutions for high-performance optical transmission modules, OKI Technical Review, Apr. 2002, pp. 82-87, vol. 69, No. 2.

International Search Report and Written Opinion for counterpart PCT application PCT/US08/62566 filed May 2, 2008.

* cited by examiner

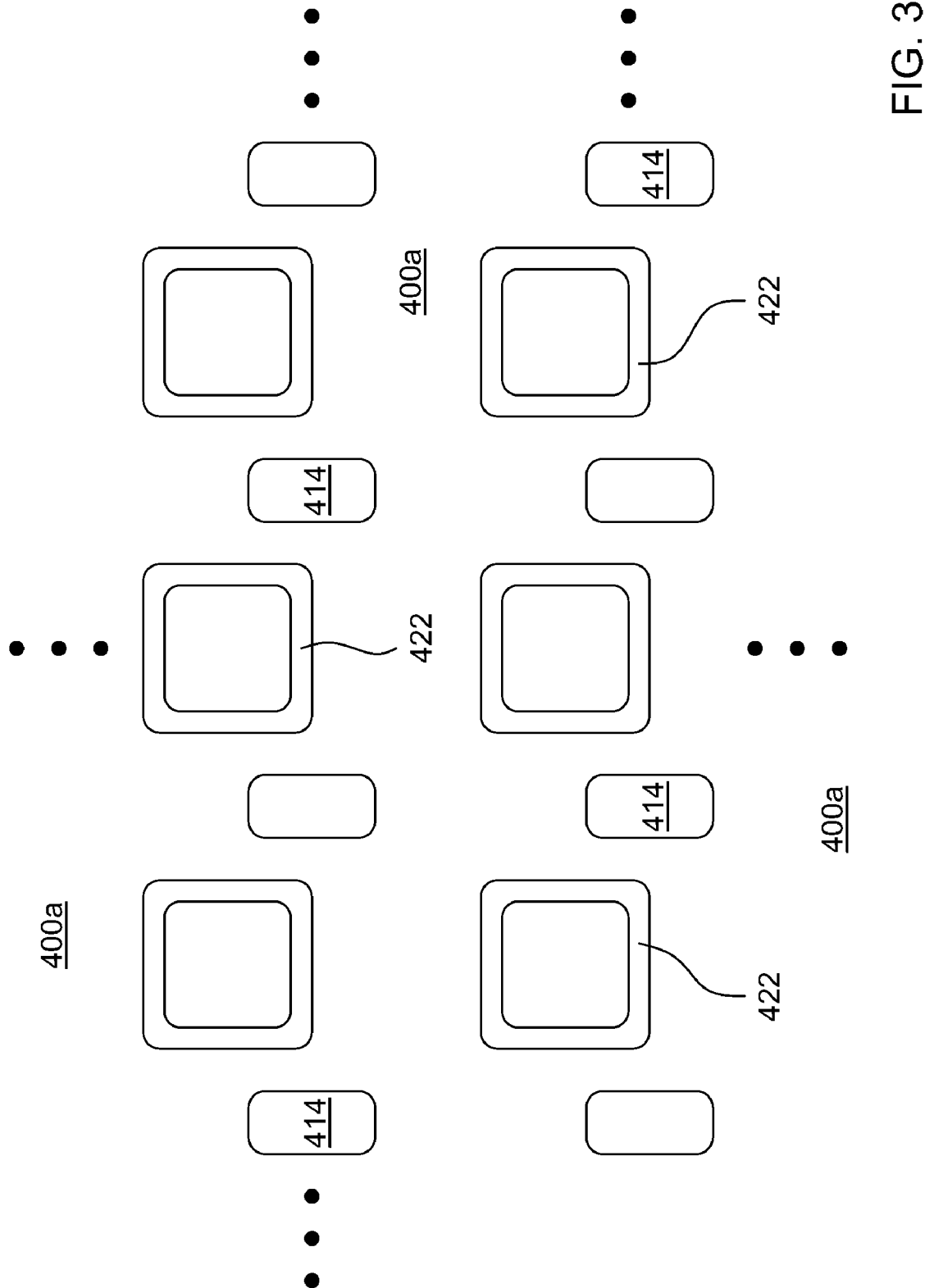

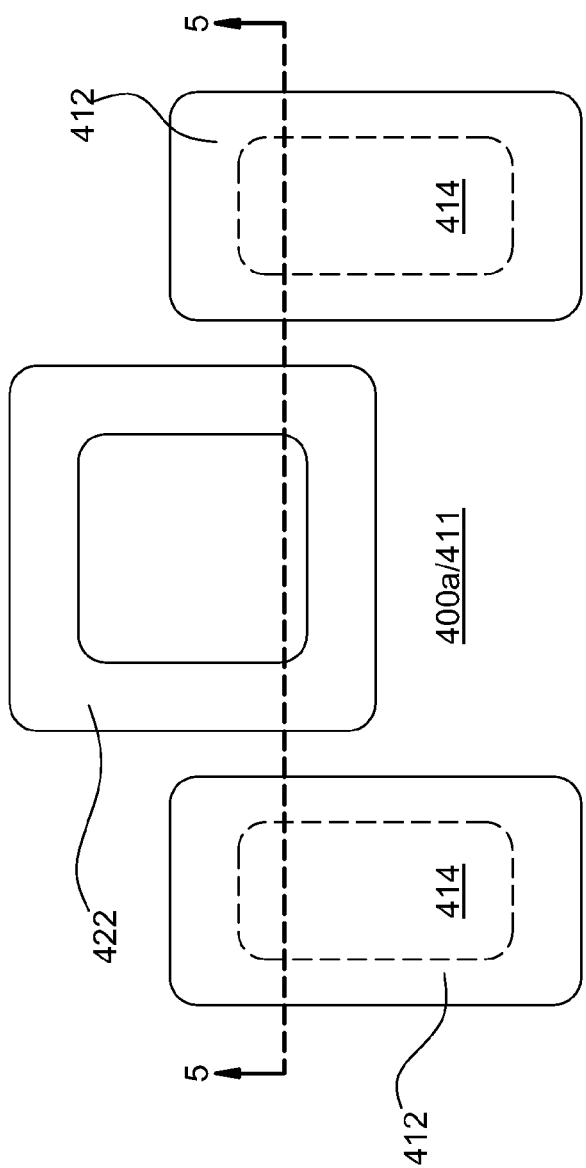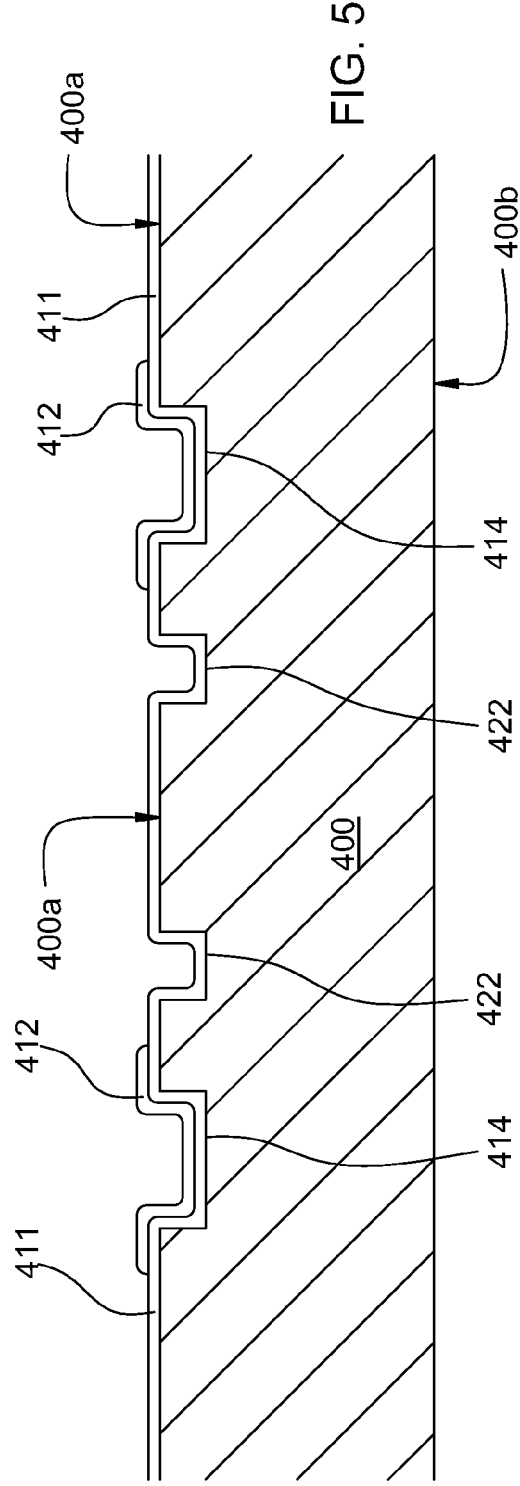

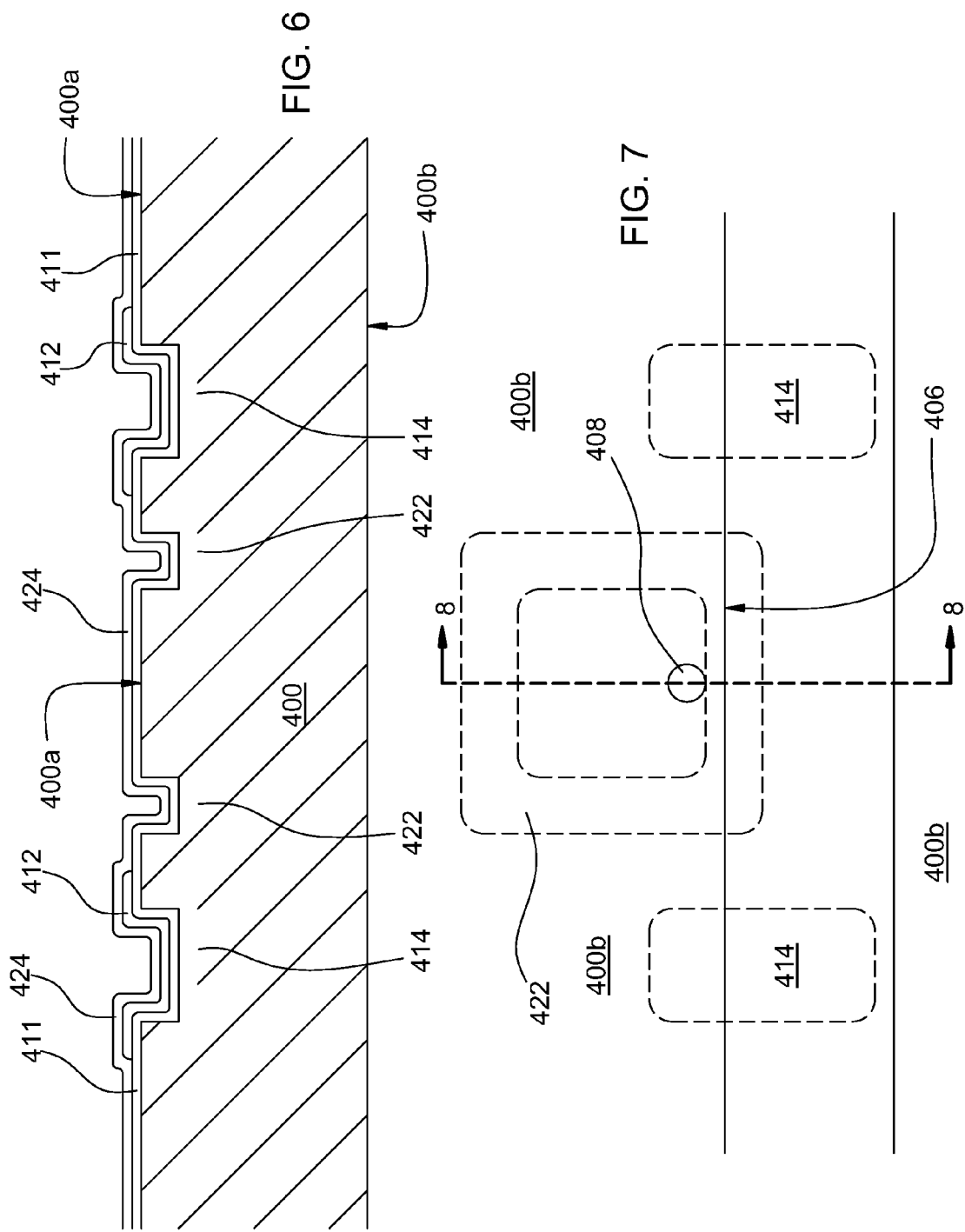

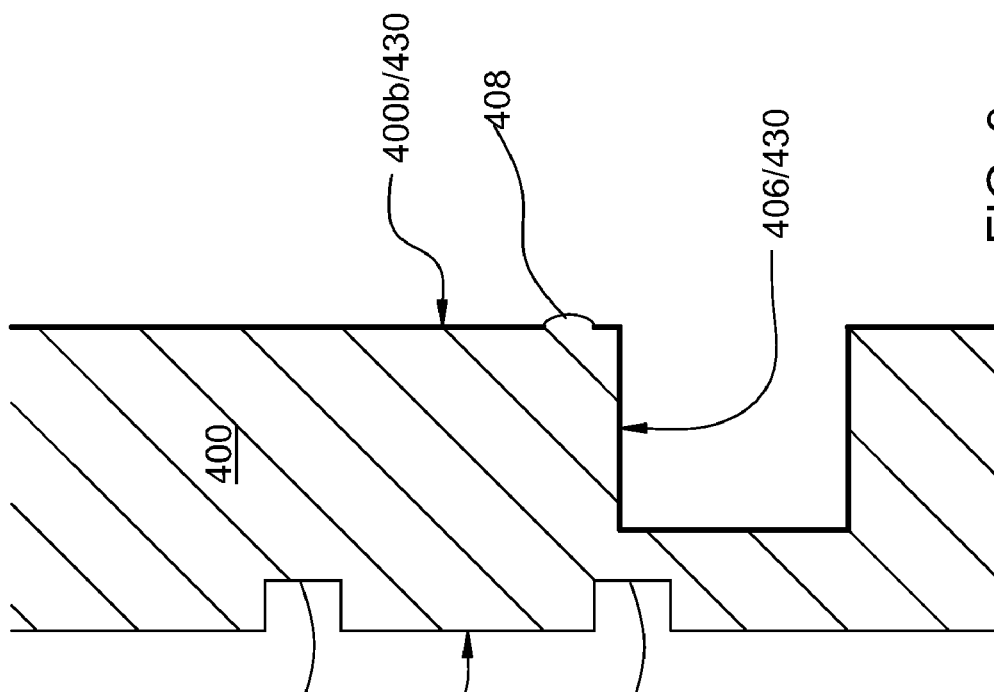
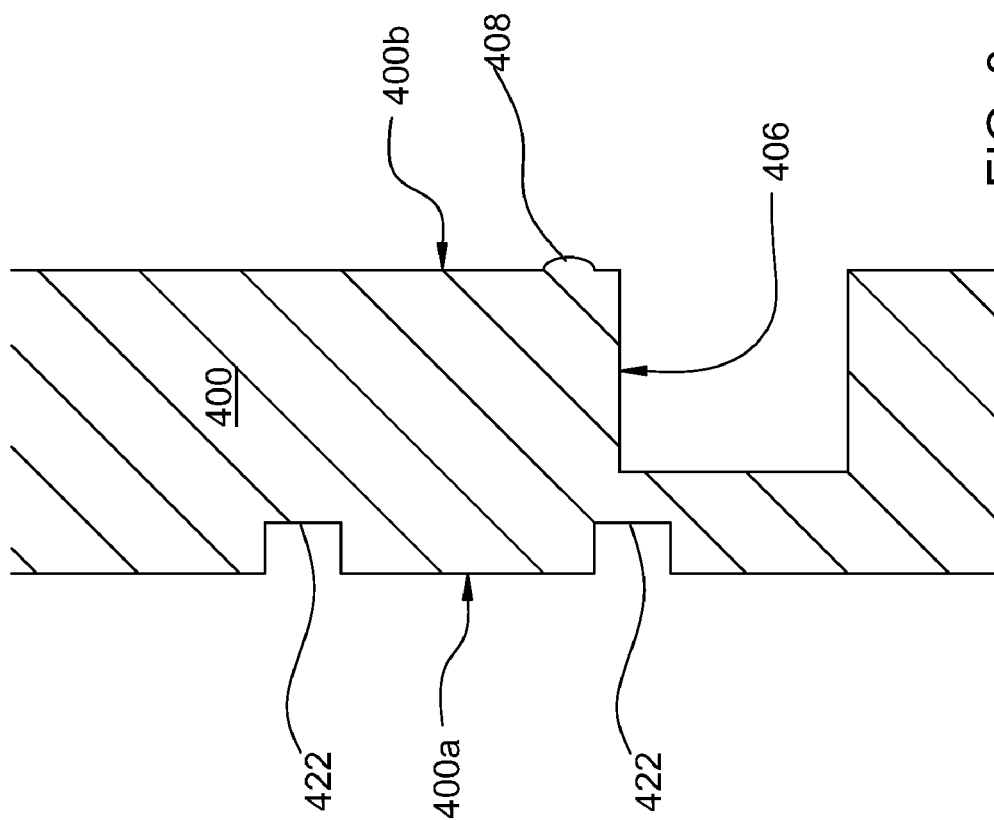

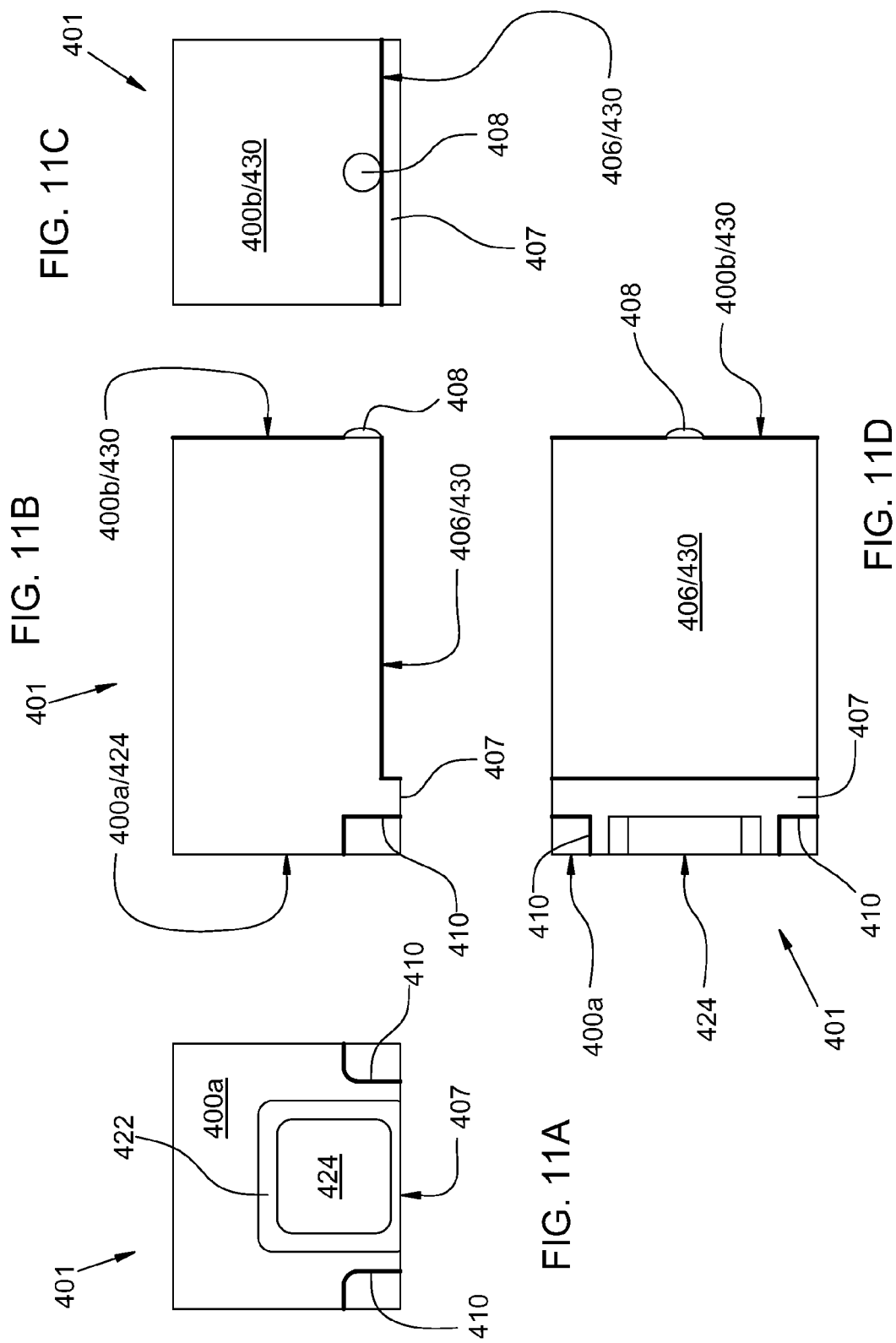

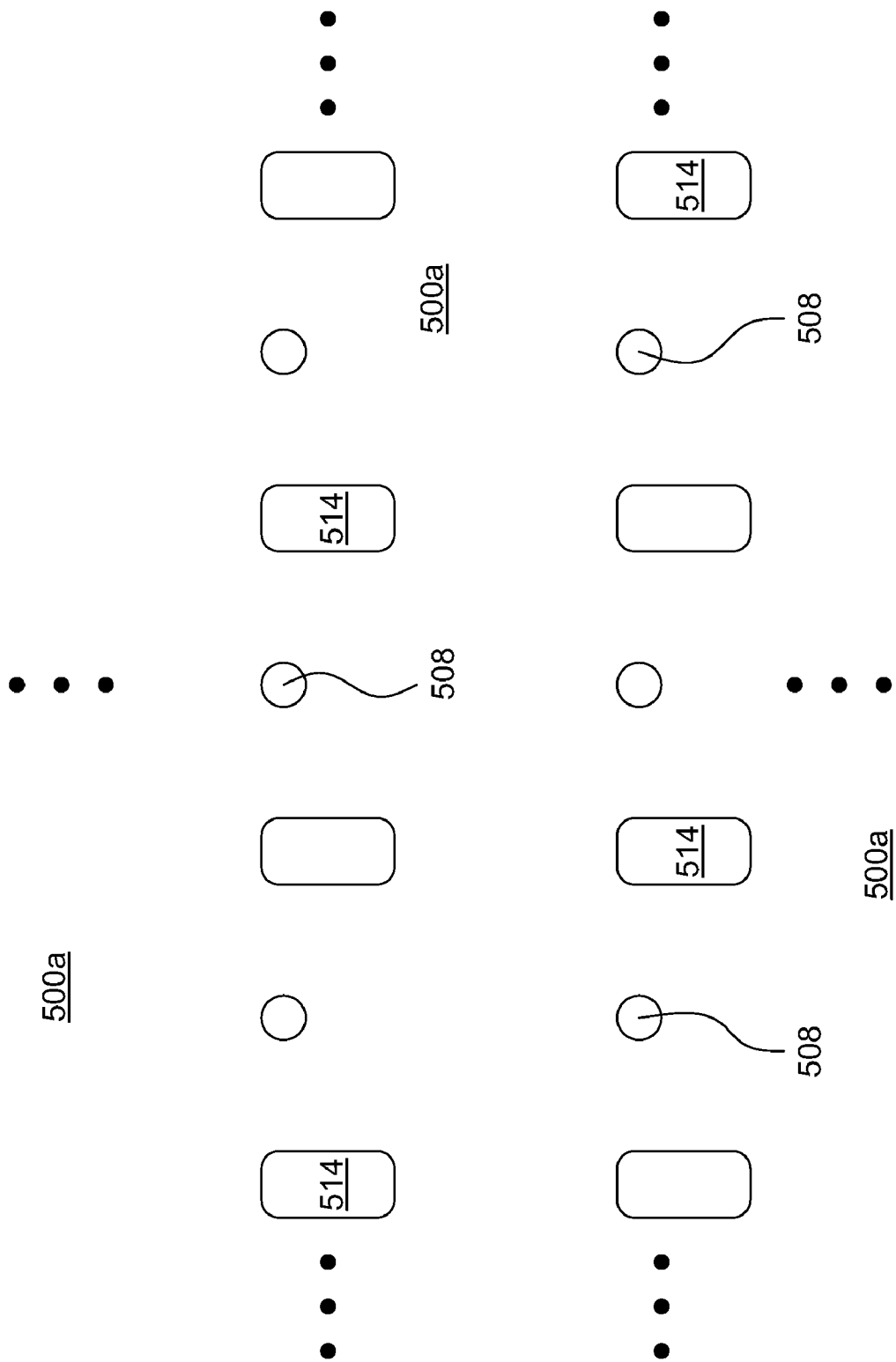

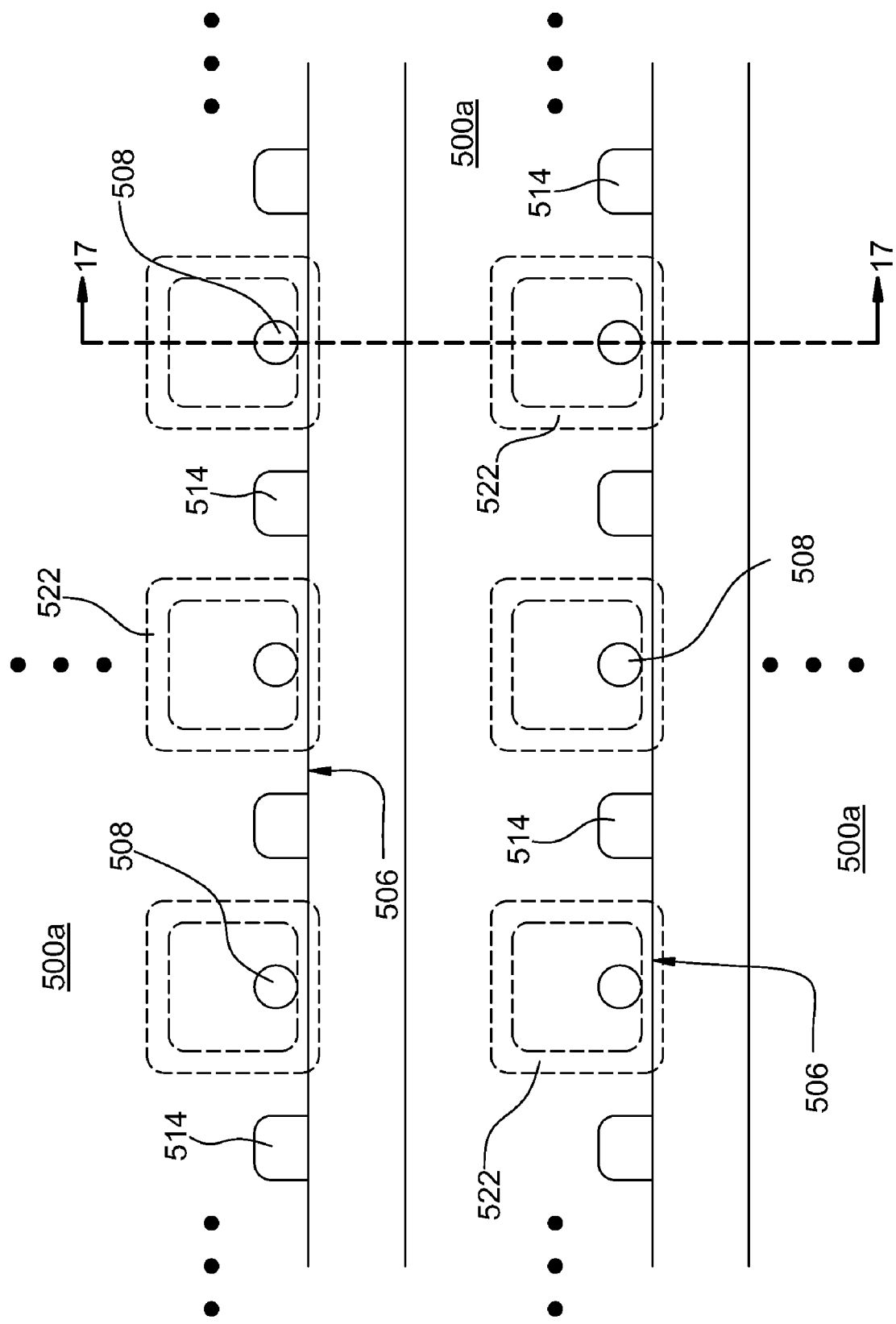

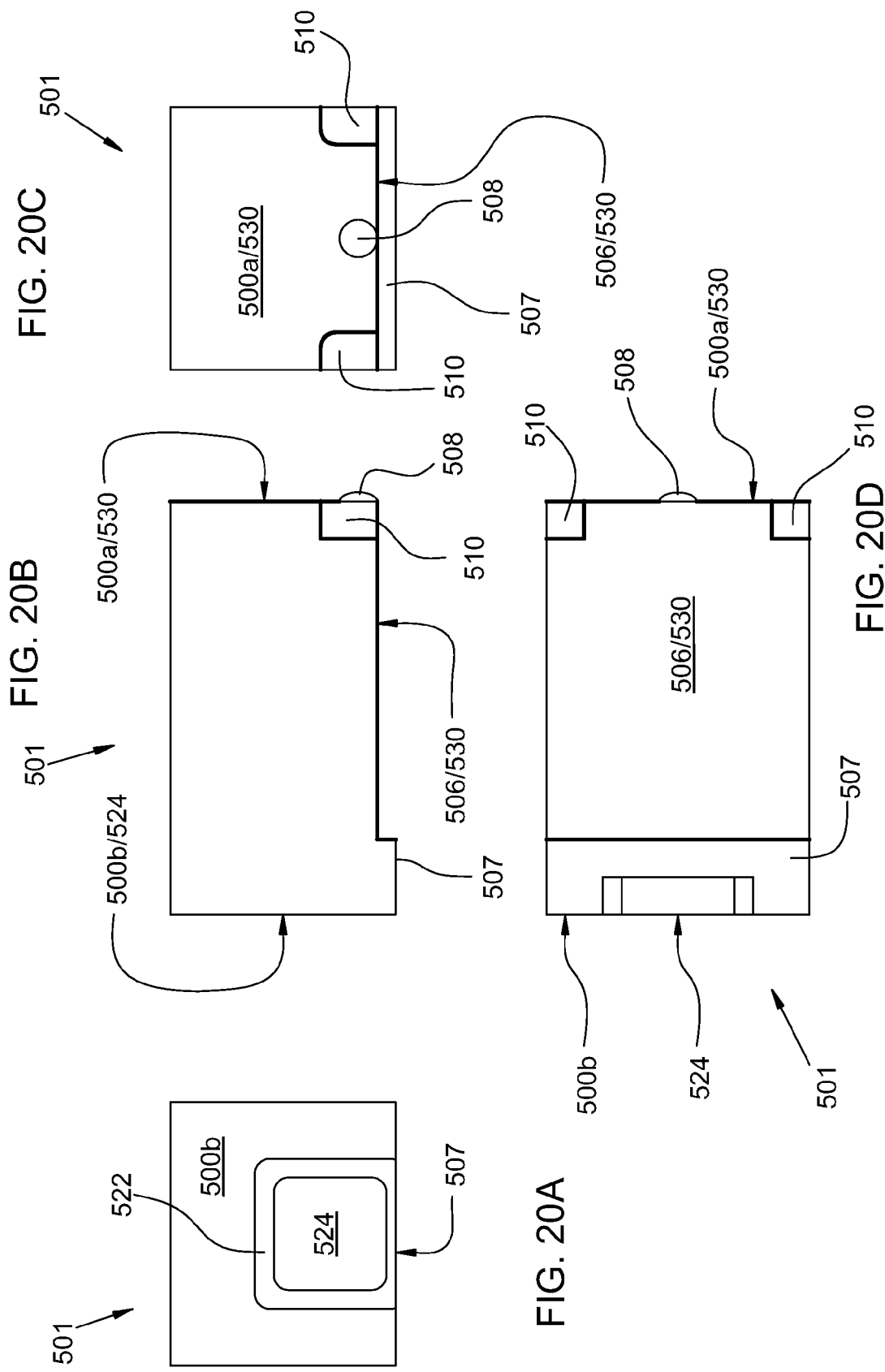

OPTICAL ELEMENT FOR FREE-SPACE PROPAGATION BETWEEN AN OPTICAL WAVEGUIDE AND ANOTHER OPTICAL WAVEGUIDE, COMPONENT, OR DEVICE

BENEFIT CLAIMS TO RELATED APPLICATIONS

This application claims benefit of U.S. provisional App. No. 60/915,677 filed May 02, 2007, said provisional application being hereby incorporated by reference as if fully set forth herein.

BACKGROUND

The field of the present invention relates to optical elements. In particular, optical elements are disclosed herein that enable free-space optical propagation between an optical waveguide and another optical waveguide, component, or device.

Planar optical waveguides are suitable for implementing a variety of optical devices for use in telecommunications and other fields. For the purposes of the present disclosure and appended claims, the term "planar optical waveguide" is intended to generally encompass waveguide structures deposited or otherwise formed on a substantially planar substrate. Optical paths defined by or among such planar waveguides can be arranged in two or three dimensions. In addition to the planar waveguides, the planar waveguide substrate often also includes (by fabrication and/or placement thereon): alignment or support structures for placement of optical components or devices on the substrate; V-grooves or other alignment or support structures for positioning of optical fibers and/or fiber-optic tapers on the substrate; compensators, gratings, filters, or other optical components, elements, or devices; electrical contacts or traces for enabling electronic access to active devices on the substrate; or other suitable components. Reflective or transmissive optical elements including, but not limited to, mirrors, beamsplitters, beam combiners, filters, lenses, and SO forth are disclosed herein for use with one or more planar optical waveguides that enable free-space optical propagation between an optical waveguide and another optical waveguide, component, or device.

Many of the optical waveguides (including both optical fibers and planar waveguides) described herein have dimensions and design parameters so as to support only one or a few lowest-order optical modes. At visible and near-IR wavelengths (e.g., those typically employed for optically-based telecommunications), the resulting optical modes are typically a few μm up to about 10 or 15 μm in transverse extent. Depending on the nature of the waveguide, the guided optical mode(s) may be nearly cylindrically symmetric, or may differ substantially in transverse extent along substantially orthogonal transverse dimensions. Modes of these wavelengths and sizes typically exhibit diffractive behavior upon emerging from the end face of the supporting waveguide and propagating as an optical beam, typically (but not always) becoming substantially divergent sufficiently far from the end face of the supporting waveguide (NA often greater than about 0.1). Accordingly, one or more of the following adaptations may be required to achieve a degree of optical power transfer above an operationally acceptable level between an end-coupled waveguide and another optical component or device: maintain the unguided optical pathlength between the waveguide and the other waveguide, component, or device as small as practicable for a particular optical assembly; adapt the end portion of the waveguide or the other waveguide, component, or device for mitigating the diffractive behavior of the optical beam beyond the waveguide; or insert one or more additional optical elements between the waveguide and the other waveguide, component, or device for refocusing, re-imaging, or otherwise manipulating the beam spatial properties for enhancing end-coupling between the waveguide and the other component or device.

It is often the case in a waveguide-based optical system or in a waveguide-based multi-component optical device that optical functionality is to be provided that cannot be readily implemented within a waveguide, and must therefore be provided by a reflective or transmissive optical element interposed in the optical path wherein an optical signal propagates as an optical beam (reflected from a reflective optical element or transmitted through a transmissive optical element). In order to implement optical functionality in this way while maintaining overall transmission through the optical system at or above an operationally acceptable level, it is typically necessary to adapt the optical system or multi-component optical device as described in the preceding paragraphs.

For purposes of the present disclosure or appended claims, the term "optical beam" shall denote so-called free-space propagation of an optical signal, determined by the diffractive behavior of electro-magnetic waves and substantially unconfined by any sort of refractive index variation, gradient, or structure that would result in waveguide-like behavior. Such free-space optical propagation can occur through vacuum, through air or another gaseous medium, through a liquid medium, or through a solid medium. In contrast, propagation of an optical signal that is confined or guided in at least one transverse dimension by a refractive index variation, gradient, or structure acting as a waveguide shall be referred to herein as an "optical mode" or a "guided mode."

The subject matter of the present application may be related to subject matter disclosed or claimed in: U.S. Pat. No. 7,031,575; U.S. Pat. No. 7,142,772; and U.S. Pat. No. 7,366,379. Each of said patents is hereby incorporated by reference as if fully set forth herein.

SUMMARY

An optical element comprises a volume of substantially transparent material having opposing first and second transmission surfaces and a mounting surface between them, an alignment mark, and an optical coating on the first or the second transmission surface. The optical element can be mounted self-supporting on a substrate with the mounting surface on a mating portion of the substrate. With the alignment mark aligned to a corresponding mark on the substrate, waveguides on the substrate can be end-coupled by reflection from the first transmission surface. The first transmission surface, the second transmission surface, and the mounting surface are arranged so as to position the first and second transmission surfaces at respective orientations relative to the substrate surface so that an optical beam propagating substantially parallel to the substrate surface and entering the optical element through the first transmission surface propagates as an optical beam through the optical element above the mounting surface and exits the optical element through the second transmission surface. The optical element can also include a lens or an aperture.

Objects and advantages pertaining to optical elements and optical waveguides may become apparent upon referring to the exemplary embodiments illustrated in the drawings and disclosed in the following written description and/or claims.

BRIEF DESCRIPTION OF THE DRAWINGS

FIG. 3 illustrates schematically a plan view of fabrication of multiple exemplary optical elements from a single substrate wafer.

FIG. 4 illustrates schematically a plan view of fabrication of an exemplary optical element from a substrate.

FIG. 5 illustrates schematically a cross-sectional view of fabrication of an exemplary optical element from a substrate.

FIG. 6 illustrates schematically a cross-sectional view of fabrication of an exemplary optical element from a substrate.

FIG. 7 illustrates schematically a backside plan view of fabrication of an exemplary optical element from a substrate.

FIG. 8 illustrates schematically a cross-sectional view of fabrication of an exemplary optical element from a substrate.

FIG. 9 illustrates schematically a cross-sectional view of fabrication of an exemplary optical element from a substrate.

FIG. 11A-11D illustrate schematically front, side, back, and bottom views, respectively, of an exemplary optical element.

FIG. 13 illustrates schematically a plan view of fabrication of multiple exemplary optical elements from a single substrate wafer.

FIG. 16 illustrates schematically a plan view of fabrication of an exemplary optical element from a substrate.

FIGS. 20A-20D illustrate schematically front, side, back, and bottom views, respectively, of an exemplary optical element.

Figure 1:
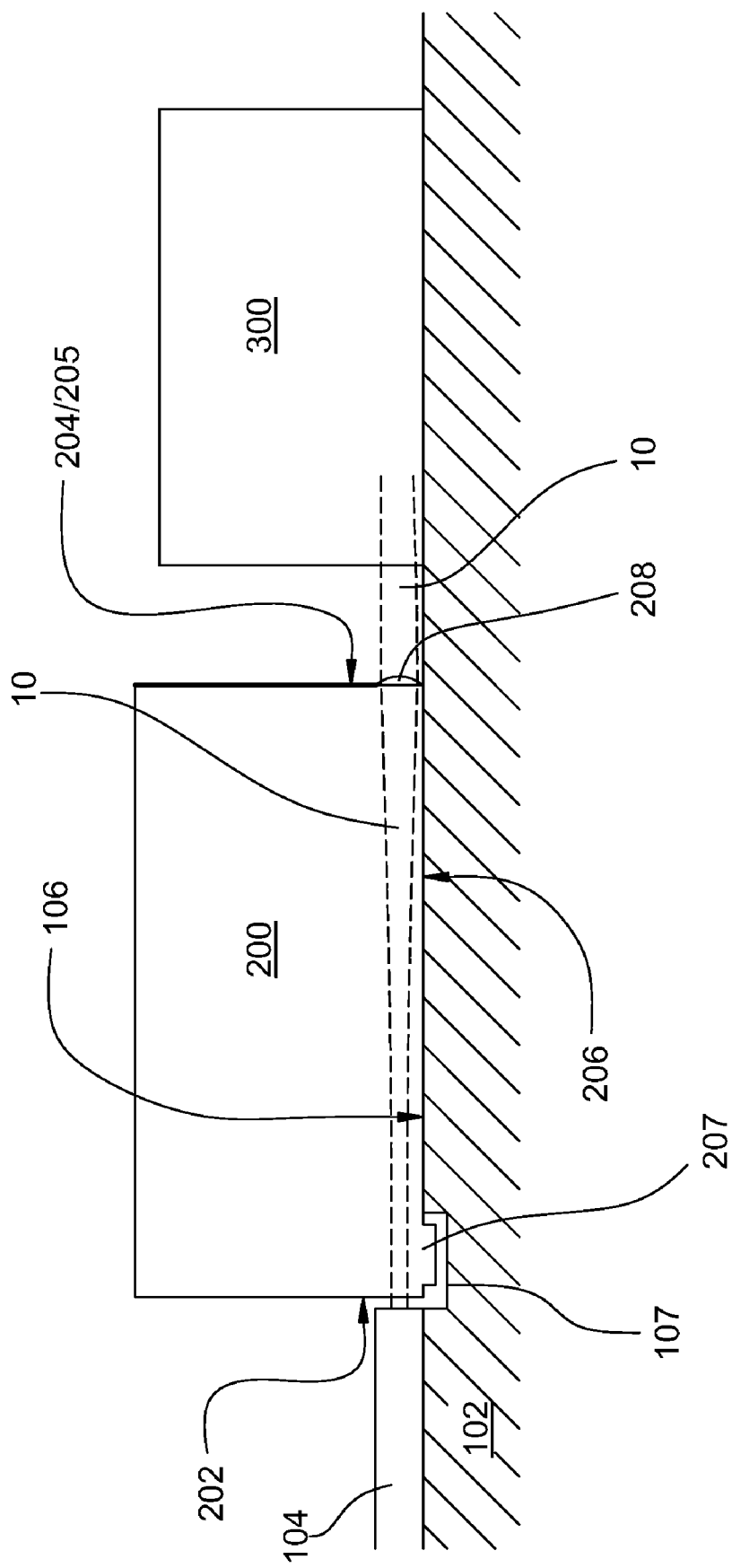
FIG. 1 illustrates schematically a side view of an optical waveguide and an exemplary optical component with an optical element between them.

It should be noted that the relative proportions of various structures shown in the Figures may be distorted to more clearly illustrate the present invention. Relative dimensions of various optical devices, optical waveguides, optical fibers, optical components, optical modes, alignment or support members, grooves, and so forth, or portions thereof, may be distorted, both relative to each other as well as in their own relative proportions. In many of the Figures the transverse dimension of an optical element is enlarged relative to the longitudinal dimension for clarity, which may cause variations of transverse dimension(s) with longitudinal position to appear exaggerated.

The embodiments shown in the Figures are exemplary, and should not be construed as limiting the scope of the present disclosure or appended claims.

DETAILED DESCRIPTION OF EMBODIMENTS

An exemplary optical element 200 is shown schematically in FIGS. 1 and 2A-2D mounted on a substrate 102 along with one or more optical waveguides. The optical element 200 comprises a volume of substantially transparent material having opposing first and second transmission surfaces 202 and 204 and a mounting surface 206. The mounting surface 206 is arranged between the transmission surfaces 202 and 204 on the lower surface of the optical element 200, below an optical path through the optical element 200 defined by a waveguide on the substrate 102 and the transmission surface 202. This is in contrast to previous optical elements (disclosed in U.S. Pat. Nos. 7,031,575; 7,142,772; and 7,366,379) in which mounting surfaces are displaced laterally from the beam path through the optical element. The optical element 200 is arranged to be self-supporting with the mounting surface 206 mated with a mating portion 106 of the substrate surface, in contrast to optical elements requiring a slot or protruding support structure on the substrate to hold it in position at a desired orientation. The optical element has optical functionality provided on the first transmission surface 202 or on the second transmission surface 204. The designations "first" and "second" are used for convenience of description only, and do not necessarily have any functional significance unless explicitly stated. The first transmission surface 202, the second transmission surface 204, and the mounting surface 206 are arranged so as to position the first and second transmission surfaces 202 and 204 at respective desired orientations relative to the surface of a substrate 102 with the mounting surface 206 on the mating portion 106 of the substrate surface. Typically the mounting surface 206 and the mating portion 106 of the substrate surface are substantially flat and generally parallel to the substrate 102, but this need not be the case. Slanted, tilted, curved, stepped, or otherwise non-planar surfaces can be employed instead. With the transmission surfaces 202 and 204 at their respective desired orientations, an optical beam 10 propagating substantially parallel to the substrate surface 106 and entering the optical element 200 through the first transmission surface 202 propagates through the optical element 200 and exits through the second transmission surface 204 without being internally reflected within the optical element 200.

Optical functionality can be provided on transmission surface 202 or 204 in any suitable way, including but not limited to: (i) one or more optical coatings formed on one or both transmission surfaces, e.g., a reflective or anti-reflective optical coating, a spectrally-selective filter coating, or a dichroic optical coating; (ii) a curved surface formed on one or both transmission surfaces, e.g., a curved surface acting as a lens; (iii) a spatially-varying surface profile formed on one or both transmission surfaces, e.g., a Fresnel lens; (iv) at least one spatially-varying optical property of at least one of the transmission surfaces, e.g., an index-gradient lens; (v) at least one anisotropic optical property of at least one of the transmission surfaces, e.g., a waveplate or polarization rotator; or (vi) at least one spectrally-varying optical property of at least one of the transmission surfaces. Other adaptations can be employed for providing optical functionality on one or both transmission surfaces 202 or 204 while remaining within the scope of the present disclosure or appended claims.

The optical element 200 can be mounted on the substrate 102 along with an optical waveguide 104 formed on the substrate 102, which may also be referred to as the waveguide substrate. The optical element 200 is mounted on the waveguide substrate 102 with the mounting surface 206 on the substantially flat portion 106 of the substrate surface. The optical element 200 is positioned so that a portion of an optical signal emerging as an optical beam 10 from an end face of the optical waveguide 104 enters the optical element 200 through the first transmission surface 202, propagates as an optical beam through the optical element 200, and exits the optical element 200 as an optical beam through the second transmission surface 204. The optical beam 10 propagates through the optical element 200 directly above its mounting surface 206. A photodetector 300 can be mounted on the substrate 102 and positioned so as to receive directly that portion of the optical signal propagating as the optical beam 10 transmitted by the optical element 200 (as in FIGS. 1, 2A, and 2B). Any photodetector suitable for mounting on substrate 102 can be employed, including, e.g., a PIN photodiode, an avalanche photodiode (APD), or photodetectors such as those disclosed in U.S. Pat. Nos. 6,992,276 and 7,148,465 (each of which is incorporated by reference as if fully set forth herein). Alternatively, the transmitted optical beam 10 can propagate through transmission surface 204 and into waveguide 301 on substrate 102 (as in FIGS. 2C and 2D).

A curved portion 208 of the transmission surface 204 can be positioned and arranged to act as a lens. Such a lens can act to direct a larger fraction of the optical signal beam 10 onto an active area of the photodetector 300, relative to the fraction that would have been received by the photodetector without the lens 208 (FIGS. 1, 2A, and 2B), or the lens can act to couple a larger fraction of the optical signal beam 10 into waveguide 301, relative to the fraction that would have been coupled into the waveguide without the lens. Instead of the curved portion 208 of the transmission surface 204, the lens can be implemented in any other suitable way, including a Fresnel lens, an index-gradient lens, or another lens-like structure or adaptation at transmission surface 204. An anti-reflective optical coating can be applied to the second transmission surface 204 or portions thereof (including the lens 208, if present) if needed or desired to enhance optical throughput of the optical element 200. A substantially opaque coating 205 with an opening therethrough can be formed on the second transmission surface to act as an aperture if needed or desired to suppress unwanted optical signals. Such an aperture (if present) can be positioned to expose at least a portion of lens 208 (if present).

Depending on the fabrication methods employed, the optical element 200 may have a protruding portion 207 near or adjacent to the mounting surface 206. Such a protruding portion can arise, for example, if the mounting surface is formed when the optical element is attached to a wafer and is subsequently divided from the wafer by cutting or cleaving (described further below). If such a protruding portion 207 of the optical element 200 is present, a corresponding groove 107 can be formed near or adjacent to the flat portion 106 of the substrate 102 to accommodate the protruding portion 207 and enable contact between the mounting surface 206 and the flat portion 106 of the substrate surface.

Figure 2A:
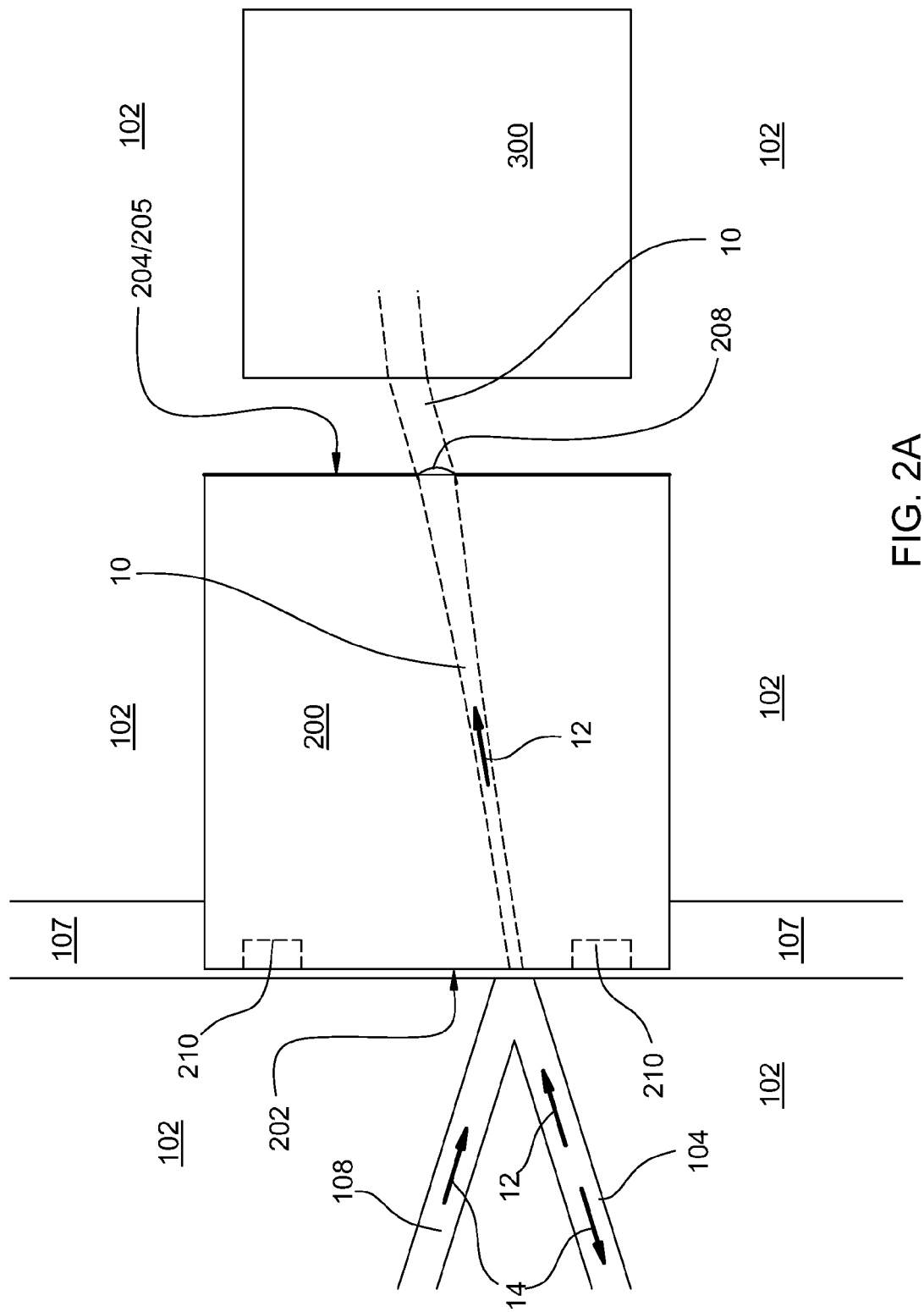
FIGS. 2A and 2B illustrate schematically a plan view of optical waveguides and an optical component with an exemplary optical element between them.
Figure 2B:
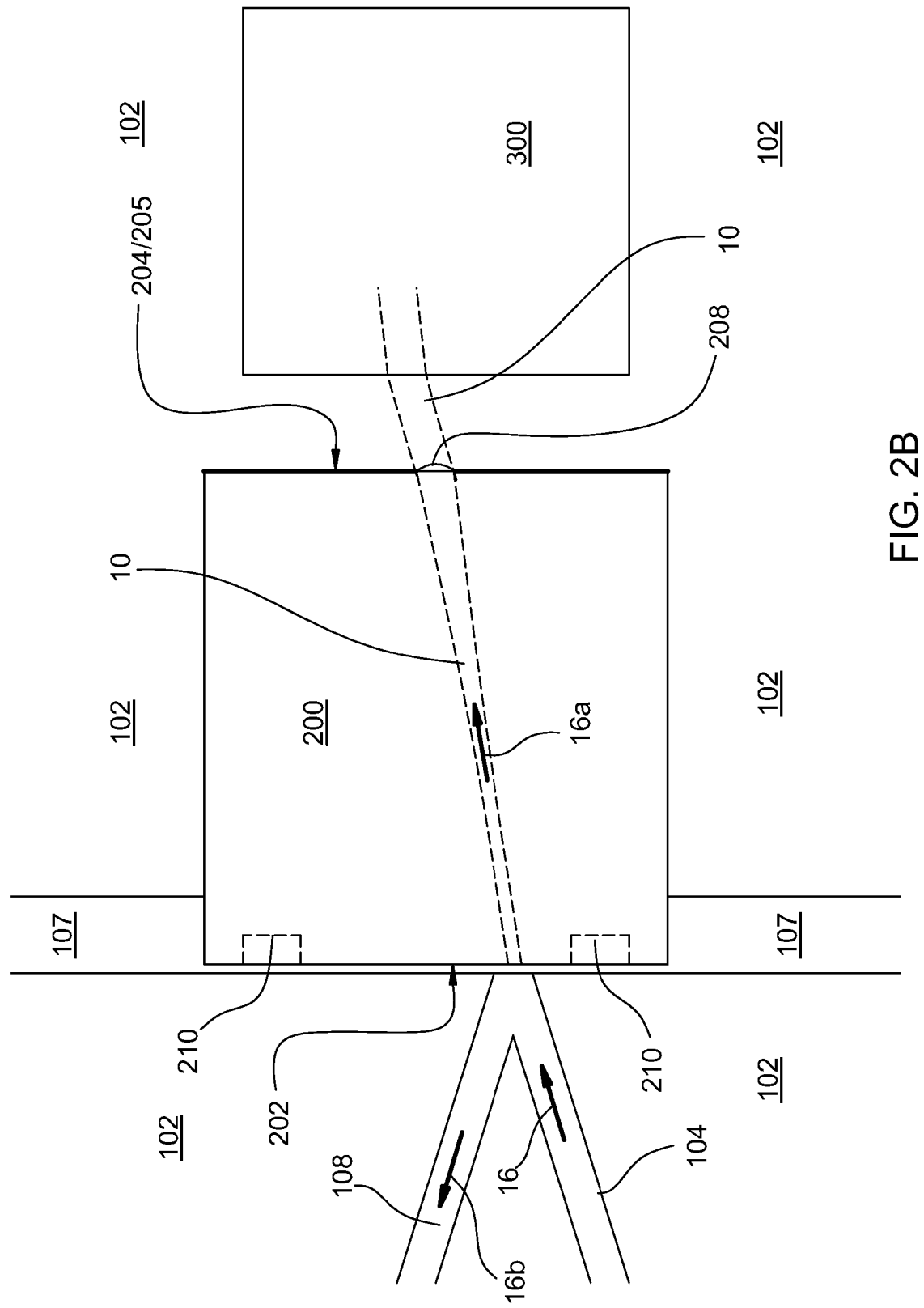
Figure 2C:
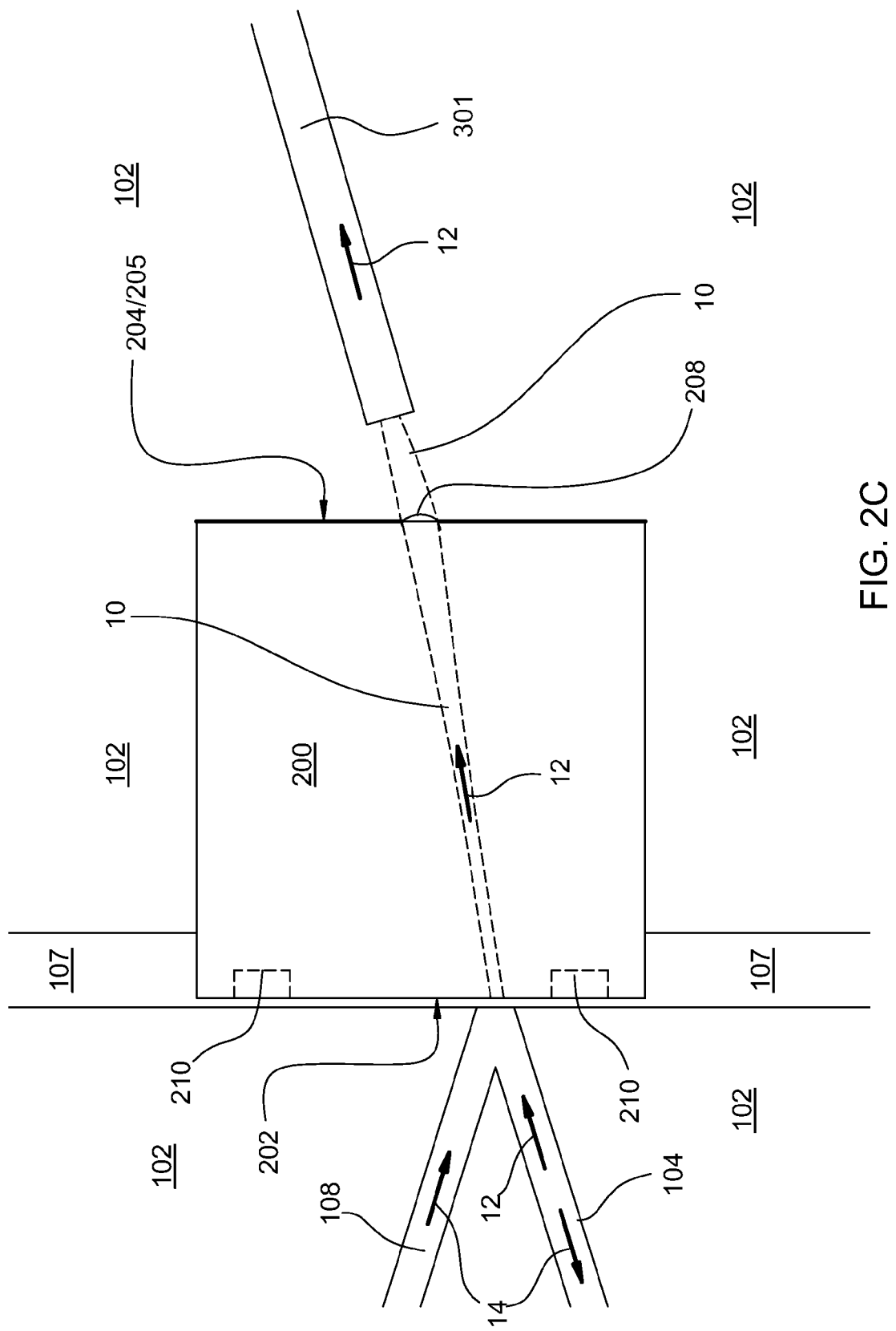
FIGS. 2C and 2D illustrate schematically a plan view of optical waveguides with an exemplary optical element between them.

Another optical waveguide 108 can be formed on the waveguide substrate 102, as illustrated schematically in FIGS. 2A-2D. In FIGS. 2A and 2C the second waveguide 108 is positioned so that a portion of an optical signal that emerges from an end face of the second optical waveguide 108 is reflected from the first transmission surface 202 of the optical element 200 and enters the first optical waveguide 104 through its end face (i.e., the waveguides 104 and 108 are end-coupled by reflection from the first transmission surface 202). Reflective optical functionality is provided on the first transmission surface 202 to reflect the optical signal from the second waveguide 108 into the first waveguide 104. Such reflective functionality is typically provided by a reflective optical coating, e.g., a metallic coating or a multilayer dielectric coating. It is often the case that the reflective coating is a dichroic optical coating, i.e., a coating that transmits over a first wavelength range while simultaneously reflecting over a second wavelength range. In the arrangement described above, reflection from the first transmission surface 202 also directs an optical signal emerging from the end face of waveguide 104 into waveguide 108 via end-coupling of the waveguides (as in FIGS. 2B and 2D).

An optical element 200 with a dichroic optical coating on the first transmission surface 202 and a lens formed on the second transmission surface 204 and arranged according to FIGS. 2A or 2C can be employed in a bidirectional optical device, e.g., a bidirectional transceiver. An incoming optical signal 12 in the transmitted wavelength range of the dichroic optical coating propagates along waveguide 104 and emerges as an optical beam 10 from the end face of the waveguide 104. The incoming signal 12 (propagating as optical beam 10) is transmitted through the first transmission surface 202 by the dichroic optical coating, propagates through the optical element 200, and exits through the lens 208 on the second transmission surface 204. This transmitted optical beam 10 is received directly by the photodetector 300 or waveguide 301, and the lens 208 can serve to increase the fraction of the transmitted optical beam that is received by the photodetector or waveguide. An outgoing optical signal 14 in the reflected wavelength range of the dichroic optical coating, e.g., from a laser or other optical source, propagates along the second optical waveguide 108 and emerges as an optical beam from the end face of the waveguide 108. The outgoing signal 14 is reflected from the first transmission surface 202 by the dichroic optical coating, enters the end face of waveguide 104, and propagates along waveguide 104. In the arrangement of FIG. 2C, the directions of signals 12 and 14 (and their respective roles as incoming and outgoing signals) could be reversed.

Figure 2D:
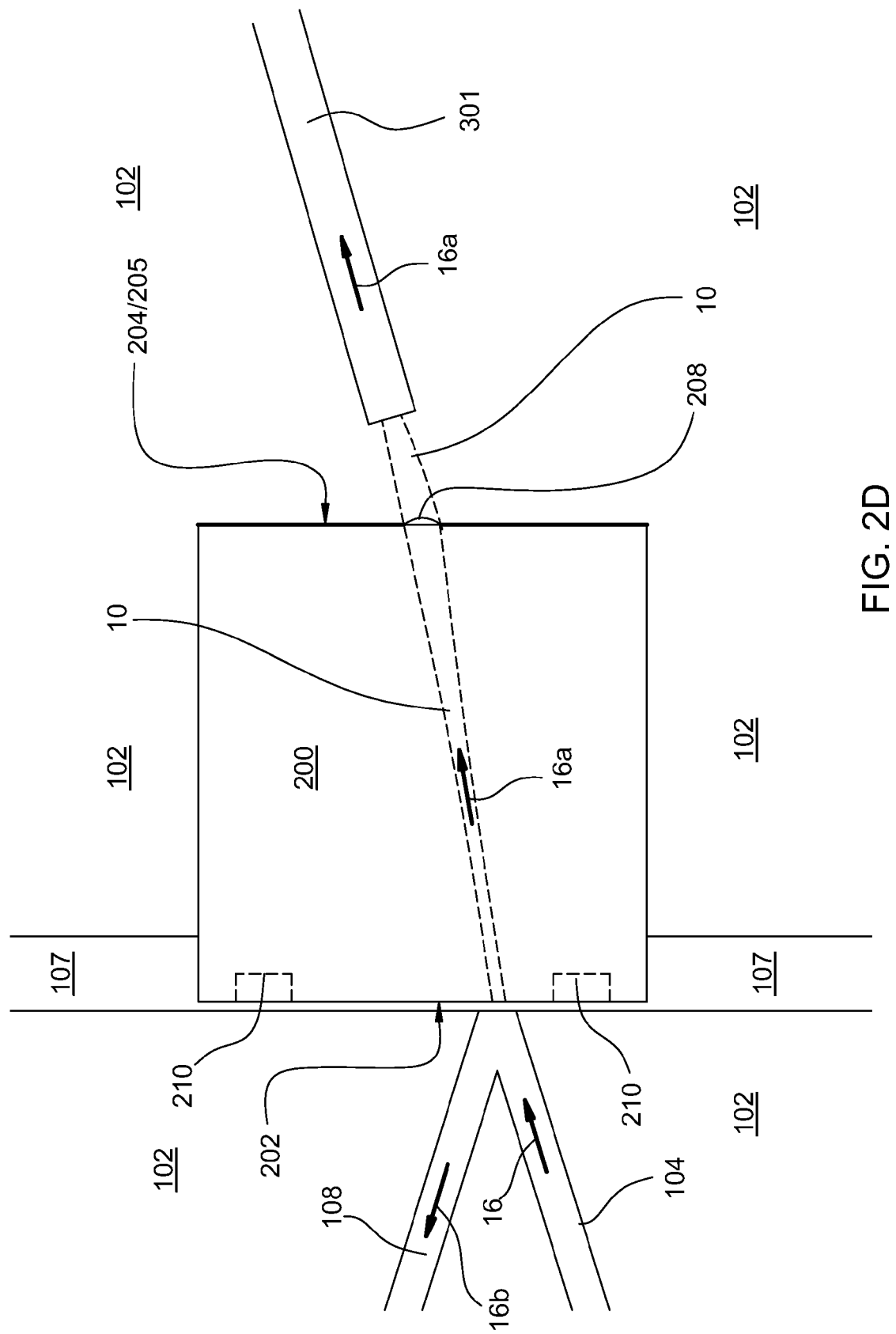
Figure 10:
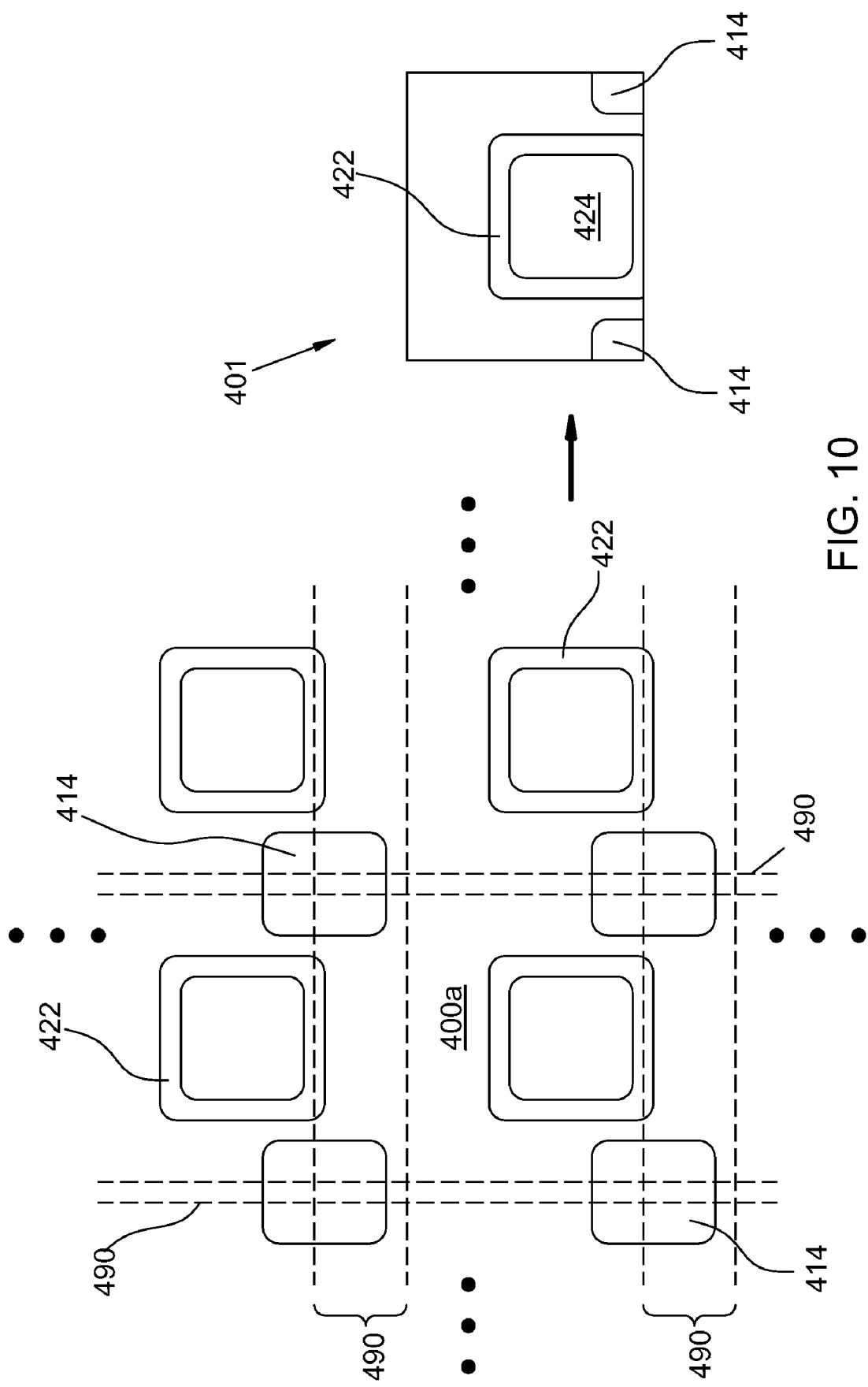
FIG. 10 illustrates schematically a top view of fabrication of multiple exemplary optical elements from a single substrate wafer.

An optical element 200 with a dichroic optical coating on the first transmission surface 202 and a lens formed on the second transmission surface 204 and arranged according to FIGS. 2B or 2D can be employed as a demultiplexer. A multichannel incoming optical signal 16, comprising wavelength-division-multiplexed optical signal portions 16a and 16b, propagates along waveguide 104 and emerges as an optical beam 10 from the end face of the waveguide 104. The first optical signal portion 16a (in the transmitted wavelength range of the dichroic optical coating) propagates as optical beam 10, and is transmitted through the first transmission surface 202 by the dichroic optical coating, propagates through the optical element 200, and exits through the lens 208 on the second transmission surface 204. The first optical signal portion 16a (transmitted as optical beam 10) is received directly by the photodetector 300 or waveguide 301, and the lens 208 can serve to increase the fraction of the transmitted optical beam that is received by the photodetector or waveguide. A second optical signal portion 16b (in the reflective wavelength range of the dichroic optical coating) emerges as an optical beam from the end face of the waveguide 104 and is reflected from the first transmission surface 202 by the dichroic optical coating, enters the end face of waveguide 108, and propagates along waveguide 108. In the arrangement of FIG. 2D, the directions of signals 16a and 16b could be reversed, with the resulting arrangement functioning as a multiplexer.

One or both transmission surface 202 or 204 can be provided with a substantially opaque layer or coating with an opening for transmitting the optical beam. Such an opening in an opaque coating can serve as an aperture or crude spatial filter by reducing the amount of stray light that exits the transmission surface. For example, in a bidirectional device as described above, a fraction of the outgoing optical signal reflected from surface 202 might leak through the reflective coating and enter optical element 200. Such a leakage signal represents an undesirable background signal against which the incoming signal is detected. A substantially opaque coating 205 on surface 204 with a suitably placed opening or aperture can selectively allow transmission of the incoming optical signal through surface 204, while blocking at least a portion of the leakage signal. In an optical element 200 that includes a lens 208 on surface 204, the opening in the opaque coating 205 is positioned so that at least part of the lens 208 is exposed by the opening through the opaque coating. Suitable coatings can include, but are not limited to, various reflective, scattering, or absorptive metal or dielectric coatings; any suitable coating material(s) or morphology can be employed. If an absorptive coating is employed, it can also be adapted so as to suppress reflection or scattering. Some examples of suitable absorptive and reflection-suppressing coatings are disclosed in U.S. Pat. Publication No. US 2006/0251849 A1, incorporated by reference as if fully set forth herein. Those examples typically comprise metal and dielectric layers arranged to suppress reflection of and absorb incident optical signals.

To facilitate proper positioning of the optical element 200 on substrate 102, the optical element can be provided with one or more alignment marks. Such marks are typically positioned on the optical element 200 relative to one or both transmission surfaces 202 or 204, or relative to lens 208 or other feature on one of the transmission surfaces. Such alignment marks are typically aligned visually (by human, aided human, or machine vision) with mating marks or features on the substrate 102 during assembly of an optical device. One example of a suitable alignment mark is an exposed edge 210 of a metal layer on the optical element 200. Such a metal layer can be deposited during fabrication of the optical element (or, more typically, simultaneous fabrication of multiple optical elements 200 on a single substrate wafer; described further hereinbelow), and then an edge of the layer can be exposed later in the fabrication process, e.g., during separation of individual optical elements from an wafer (also referred to as "singulation"). By virtue of the inherent accuracy of typical spatially-selective material processing (e.g., etching or lithography), the alignment marks thus formed are positioned with a similar degree of accuracy and precision as the transmission and alignment surfaces.

Instead of, or in addition to, alignment marks, mechanical alignment structures can be formed on the optical element 200 and arranged to engage a mating alignment structure on the substrate surface. For example, an alignment edge, ridge, surface, or other structure can be formed on the optical element and positioned against a mating alignment edge, ridge, surface, or other structure formed on substrate 102.

The optical element 200 can be fabricated from any material sufficiently transparent over any desired wavelength range. For optical telecommunications applications, wavelengths ranging from visible into the near-IR (up to about 1.7 µm) are typically employed. Suitable materials can include, but are not limited to, dielectric materials or semiconductor materials. Materials employed can be amorphous or crystalline. If crystalline, it can be advantageous to fabricate the optical element 200 so that the transmission surfaces 202 or 204 or the mounting surface 206 is substantially parallel to a respective crystal plane of the crystalline material. In some cases this can allow use of cleaving or anisotropic wet etching to form the surface. Use of crystal planes can also increase the accuracy or precision of the relative orientations of the transmission and mounting surfaces of the optical element.

Any suitable fabrication techniques can be employed for forming the optical element 200. It can be advantageous to fabricate simultaneously many optical elements on a common wafer using spatially-selective material processing techniques, e.g., etching or lithography.

An exemplary method for forming multiple optical elements is illustrated schematically in FIGS. 3-10. Wafer 400 typically comprises a single crystal semiconductor wafer having parallel first and second surfaces 400a and 400b that are parallel to a crystal plane of the crystalline semiconductor material. The designations "first" and "second" are used for convenience of description only, and do not necessarily have any functional significance unless explicitly stated. The method comprises (not necessarily in order): (i) spatially-selectively processing the first surface of the wafer to define multiple alignment features; (ii) spatially-selectively processing the second surface of the wafer to define multiple lenses and multiple mounting surfaces; (iii) forming an optical coating on the first wafer surface; and (iv) dividing (i.e., singulating) the wafer into individual optical elements. Details of specific examples of each of these steps are given below. In this exemplary fabrication process, an optical coating and alignment marks are formed on the first side of the wafer and a lens and mounting surface are formed on the second side of the wafer. The wafer surfaces correspond to the transmission surfaces of the optical elements that are eventually formed, with the length of the optical elements (between their respective transmission surfaces) being roughly equal to the wafer thickness (as reduced by any of the processing steps), typically several hundred µm, e.g., for a silicon wafer. Any suitable wafer material or thickness can be employed as needed or desired.

FIG. 3 (a plan view of the first wafer surface 400a) illustrates schematically the locations of multiple recessed areas 414 etched on the first surface 400a of wafer 400. The recessed areas are typically formed by a masked etch process, but can be formed by any suitable spatially-selective material processing technique. The bottom or side surfaces (i.e., edges) of the etched recessed areas 414 define the eventual locations of the alignment features (alignment marks in this example; alternatively, alignment edges or surfaces or other structures can be employed). Multiple trenches 422 are also shown etched on the first surface 400a of wafer 400, and each circumscribes an area that eventually becomes the first transmission surface of the corresponding optical element (as described further below). FIGS. 4 and 5 (plan and cross-sectional views, respectively, of wafer 400) illustrate schematically a metal coating 412 spatially-selectively deposited on wafer surface 400a to cover the bottom and edges of the recessed areas 414. The metal layer 412 can be deposited directly on the semiconductor, or on an oxide or other dielectric layer 411 deposited or grown or formed on wafer surface 400a. The metal layer 412 or other subsequent layers would still be considered "on" wafer surface 400a, the presence of an intervening dielectric layer notwithstanding. Spatially-selective deposition of metal layer 412 can be achieved by masked deposition of the metal layer, or by spatially-selective removal of the metal layer after its non-selective deposition (e.g., via a "lift-off" process). Edges of the metal layer 412 are exposed in subsequent fabrication steps, and the edges thus exposed comprise visible alignment marks having locations determined by the bottom or edges of the etched depressions 414.

Optical functionality can be provided on the first wafer surface 400a in any suitable way, including but not limited to those disclosed above. FIG. 6 illustrates schematically an optical coating 424 deposited on the wafer surface 400a, including the bottom and edges of trenches 422. The deposited optical coating can be of any needed, desired, or suitable type, including but not limited to an anti-reflection coating, a high-reflecting or partially-reflecting coating, a dichroic optical coating, or a spectrally- selective filter coating. Seams in the deposited coating that typically form at the bottom of the trenches 422 serve to limit fracturing of the coating that typically occurs when the wafer 400 is divided into individual optical elements (by saw cuts, cleaving, or other suitable means; described further below). A fracture that propagates through the coating typically terminates at the seams in trenches 422, leaving substantially undisturbed the coating on those portions of the coating 424 circumscribed by corresponding trenches 422.

Figure 21E:
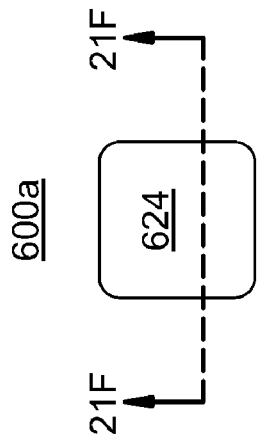
FIGS. 21E and 21F are plan and cross-sectional views, respectively, of fabrication of an exemplary optical element from a substrate.
Figure 21C:
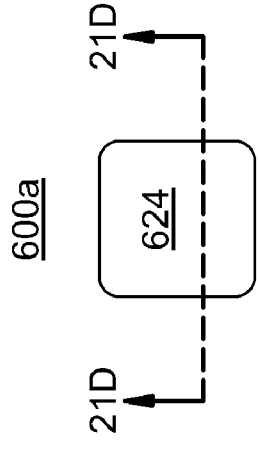
FIGS. 21C and 21D are plan and cross-sectional views, respectively, of fabrication of an exemplary optical element from a substrate.
Figure 21A:
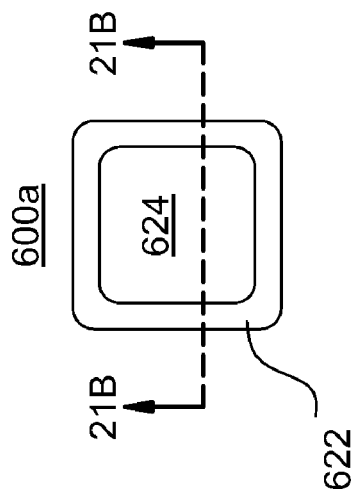
FIGS. 21A and 21B are plan and cross-sectional views, respectively, of fabrication of an exemplary optical element from a substrate.
Figure 21F:
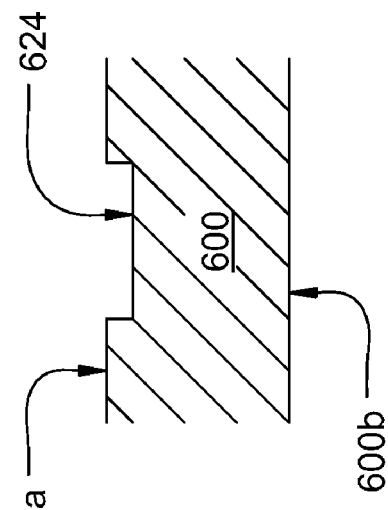
Figure 21D:
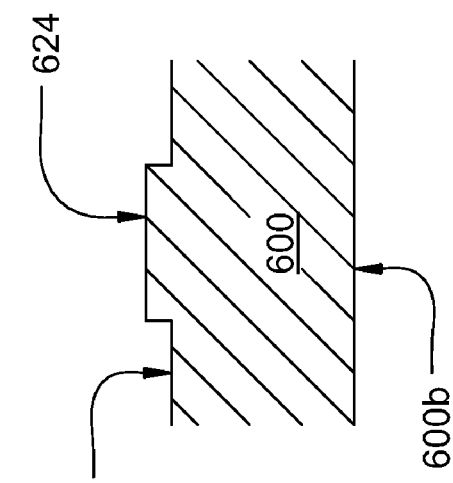
Figure 21B:
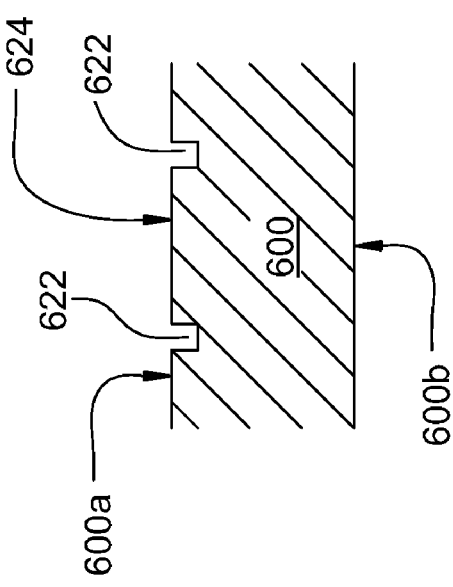

For limiting fracturing of an optical coating when the optical elements are divided from one another, any suitable arrangement can be employed in which a discontinuity of the surface 600a of a wafer 600 separates a circumscribed transmission area 624 (intended to transmit optical signals through the finished optical element) from the rest of the wafer surface 600a (FIGS. 21A-21F). In FIGS. 21A and 21B, a trench 622 is shown surrounding area 624 intended to transmit optical signals and separating area 624 from the remainder of the wafer surface 600a (similar to the exemplary arrangements shown in FIGS. 3-20). In FIGS. 21C and 21D, the area 624 comprises a plateau that protrudes from the surrounding wafer area 600a. In FIGS. 21E and 21F, the area 624 is recessed relative to the surrounding wafer area 600a. In all of these examples, seams that would typically appear in a trench or at an edge of a plateau or recessed area serve to limit propagation of cracks in a deposited optical coating that might arise when the optical elements are divided from one another. However, optical elements lacking such features (i.e., wherein the area intended to transmit optical signals is contiguous with the surrounding wafer surface) shall also fall within the scope of the present disclosure or appended claims.

FIGS. 7 (a view of the second wafer surface 400b) and 8 (a wafer cross section) schematically illustrate the formation of multiple mounting surfaces 406 and multiple lenses 408 by processing the second surface 400b of the wafer 400. The mounting surfaces 406 and lenses 408 are appropriately positioned relative to the etched trenches 422 (if present) and the etched depressions 414. The mounting surfaces 406 can be formed by any suitable spatially-selective material processing technique for forming trenches or depressions in the wafer surface 400b, and typically comprise substantially flat side walls of such trenches or depressions. For example, a masked, anisotropic wet etch process can be employed so that the resulting mounting surfaces 406 are parallel to a crystal plane of the wafer 400. In another example, beam etching of any suitable type (e.g., ion beam etching) can be employed to form mounting surfaces 406 at a desired angle relative to the substrate surface 400b. The mounting surfaces 406 are often oriented substantially perpendicular to the substrate surface 400b (resulting in transmission surfaces substantially perpendicular to the mounting surface in the finished optical element), but this need not be the case if a different relative orientation is needed or desired. The curved portions of the second wafer surface 400b that form the lenses 408 can be formed by any suitable process, including but not limited to: spatially-selective deposition and subsequent reflow of material on the second wafer surface 400b; a grayscale lithographic process, with or without reflow; a multistep or multilevel lithographic etch process, with or without reflow; or an etch step to form a flat plateau followed by an isotropic etch or other smoothing process. In one example, a circumscribed spot of deposited photoresist can be reflowed to form a lens-like shape. Subsequent dry etching of that area of the wafer transfers the surface profile of the reflowed photoresist onto the etched wafer surface. Any other suitable process can be employed. The lens 408 can be formed on a flush portion, a recessed portion, or a raised portion of the second substrate surface 400b. Forming a convex lens surface within a depression on the wafer surface (as in FIG. 15) can serve to protect the lens surface during subsequent processing or handling of the wafer or the finished optical elements.

A metal coating or other substantially opaque coating 430 (as described above) can be deposited on the second substrate surface 400b (FIG. 9). Openings are formed in the opaque coating 430 that leave the lenses 408 at least partly exposed. The openings can be formed by spatially-selective masking of the lenses prior to deposition of the opaque coating 430, or by spatially-selective removal of portions of the opaque coating 430 from the lenses 408 after its deposition. The opaque coating 430 can serve to reduce the amount of stray light transmitted through the finished optical element, as described above. If a metal opaque coating is employed, it can be extended onto the mounting surfaces 406 to facilitate mounting of the optical element onto a waveguide substrate, e.g., by soldering or tacking onto metal members on the waveguide substrate. In one example, the opaque coating 430 can comprise layers of silicon with layers of titanium or chromium arranged for absorption and reflection suppression (as disclosed in previously-incorporated Pat. Pub. No. US 2006/0251849 A1), with a layer of gold deposited over them to facilitate soldering of the optical element to a waveguide substrate. The opaque coating can be substantially uniform over surfaces 400b and 406, or can vary among those surfaces or different regions thereof. For example, a substantially conformal deposition process can produce substantially uniform layers on surfaces 400b and 406. In contrast, a directional deposition process would typically result in coating thickness or morphology that differed between surfaces 400b and 406. If a directional process were employed and directed toward a tilted substrate, some areas of the wafer might be shaded and therefore left uncoated (e.g., the wall of the trench opposite surface 406). Any of these variations in the opaque coating 430 shall fall within the scope of the present disclosure or appended claims.

After processing the first and second wafer surfaces, the wafer 400 is divided (i.e., singulated; e.g., by saw cuts 490 as in FIG. 10) into individual optical elements 401, each having coated transmission surface area 424, mounting surface 406, lens 408, and alignment marks 410 (FIGS. 11A-11D). The individual optical elements 401 can be separated (i.e., singulated) by any suitable method, including but not limited to cleaving the wafer or cutting the wafer (using a saw, laser, or other cutting tool). Recessed areas 414 are arranged so as to intersect cuts 490 (or cleavage planes) separating one optical element from another, thereby exposing edges of the previously-deposited metal layer 412. The exposed edges form alignment marks 410 on the optical element 401 for facilitating proper positioning of the optical element on a waveguide substrate or other substrate surface. Whatever procedure is employed to separate the individual optical elements, a protruding portion or ridge 407 typically will be left adjacent the mounting surface 406. The presence of ridge 407 would interfere with proper positioning of the optical element 401 on a flat mounting surface, e.g., on a waveguide substrate. A groove, slot, or pocket is typically formed on the waveguide substrate adjacent a flat mounting portion thereof to accommodate ridge 407 and allow proper engagement of the mounting surface 406 with a substantially flat substrate.

Figure 12A:
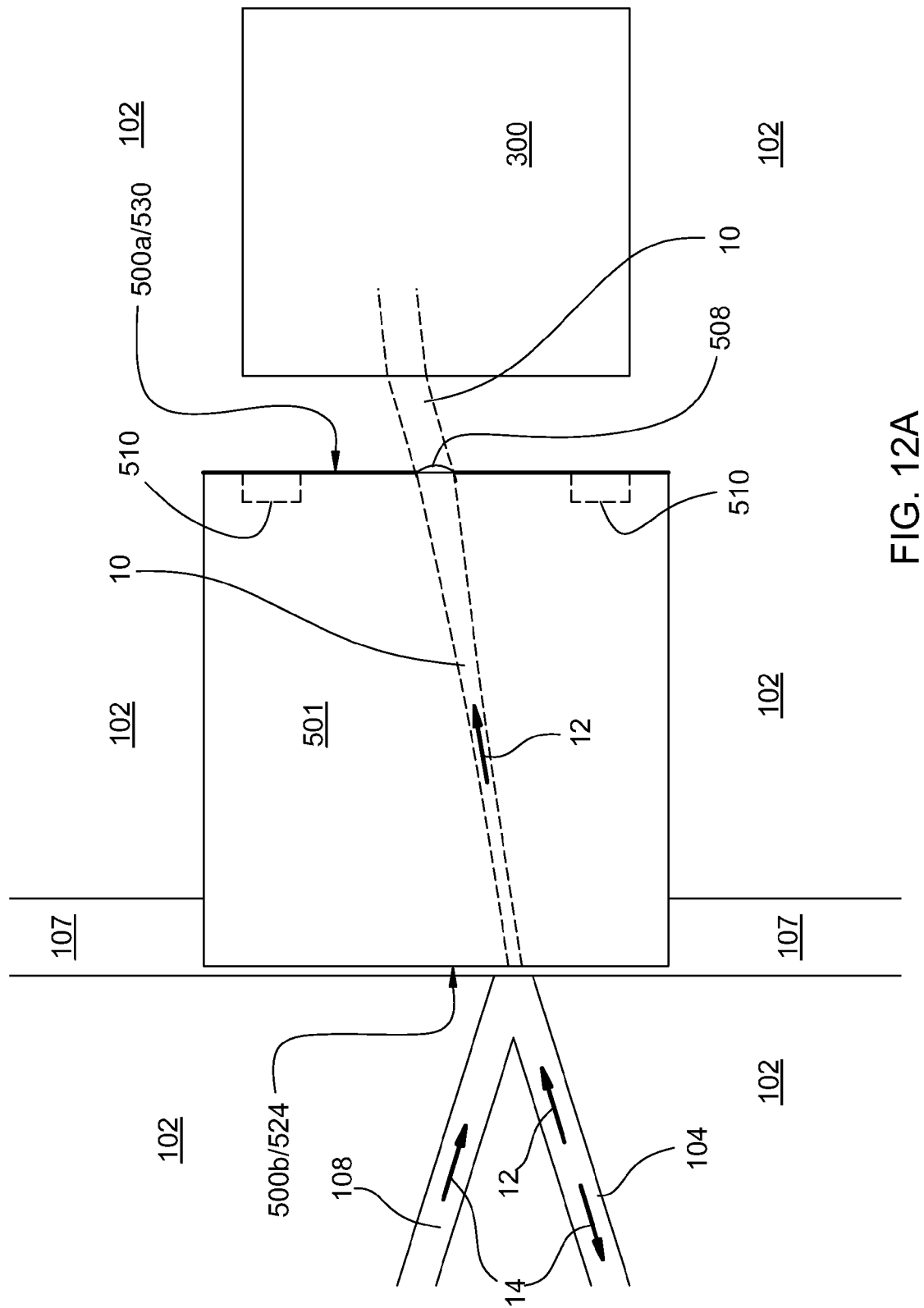
FIGS. 12A and 12B illustrate schematically a top view of optical waveguides and an optical component with an exemplary optical element between them.
Figure 12B:
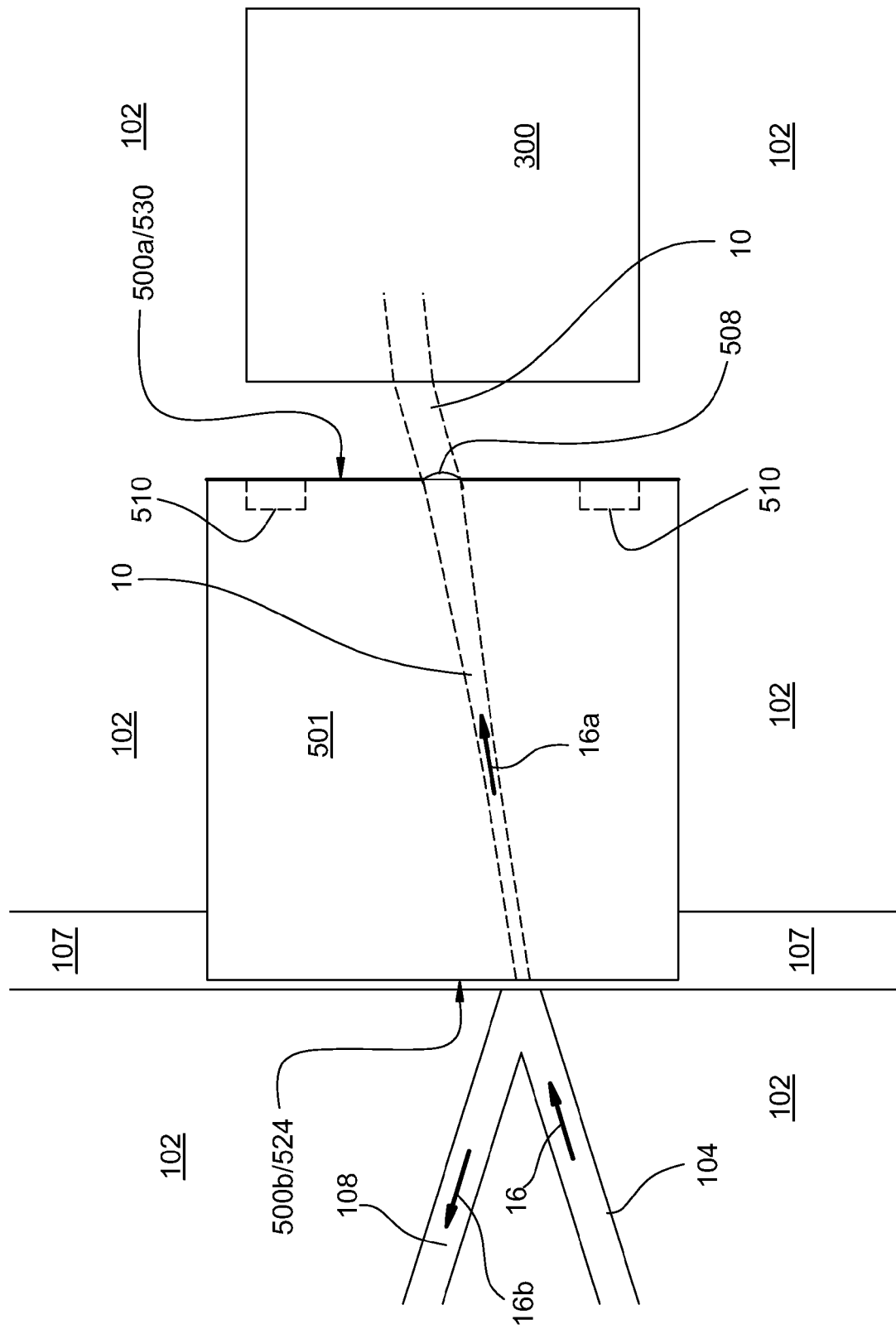

Another exemplary embodiment of an optical element 501 is shown in FIGS. 12A-12B, and an exemplary method for forming multiple such optical elements is illustrated schematically in FIGS. 13-19. The exemplary arrangements of FIGS. 12A and 12B are analogous to the arrangement of FIGS. 2A (bidirectional) and 2B (demultiplexer) and included photodetector 300. Arrangements analogous to FIGS. 2C and 2D that include an additional waveguide (not shown) can also be implemented. Wafer 500 typically comprises a single crystal semiconductor wafer having parallel first and second surfaces 500a and 500b that are parallel to a crystal plane of the crystalline semiconductor material. The designations "first" and "second" are used for convenience of description only, and do not necessarily have any functional significance unless explicitly stated. The method comprises (not necessarily in order): (i) spatially-selectively processing the first surface of a wafer to define multiple alignment features and multiple lenses; (ii) spatially-selectively processing the first surface of the wafer to define multiple mounting surfaces; (iii) forming an optical coating on the second wafer surface; and (iv) dividing the wafer into individual optical elements. In this exemplary fabrication process, the lens, alignment marks, and mounting surface are formed on the first side of the wafer and an optical coating is formed on the second side of the wafer. The wafer surfaces correspond to the transmission surfaces of the optical elements that are eventually formed, with the length of the optical elements (between their respective transmission surfaces) being roughly equal to the wafer thickness (as reduced by any of the processing steps), typically several hundred µm, e.g., for a silicon wafer. Any suitable wafer material or thickness can be employed as needed or desired.

FIG. 13 (a plan view of wafer surface 500a) illustrates schematically the locations of multiple recessed areas 514 etched on the surface 500a of wafer 500, and of multiple lenses 508 formed on surface 500a of wafer 500. The recessed areas 514 are typically formed by a masked etch process, but can be formed by any suitable spatially-selective material processing technique. The bottom or side surfaces (i.e., edges) of the etched recessed areas 514 define the eventual locations of the alignment features (alignment edges in this example; alternatively, alignment marks or surfaces or other structures can be employed). Lenses 508 can be formed by any suitable process, including those previously recited.

Figure 14:
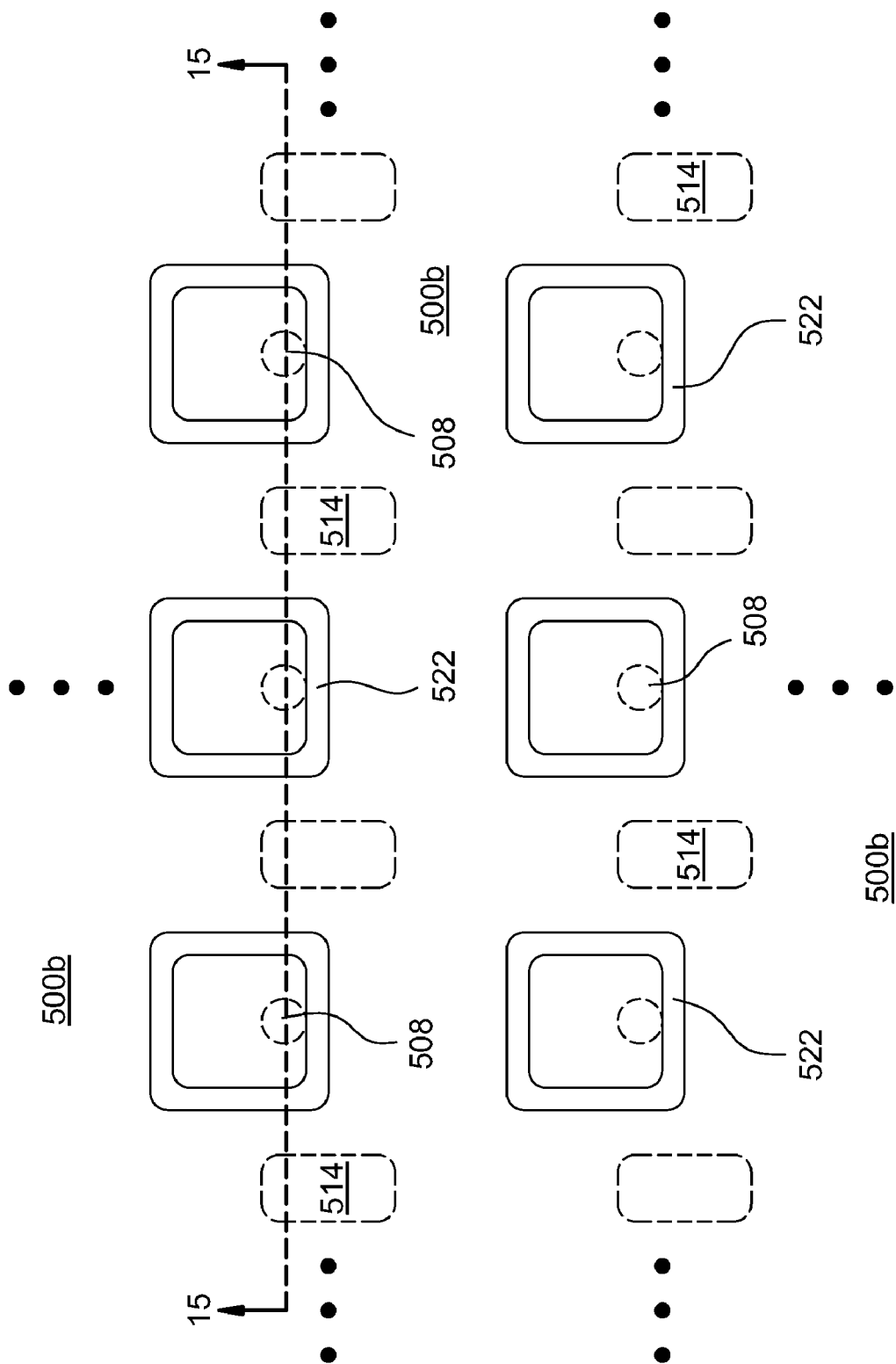
FIG. 14 illustrates schematically a backside plan view of fabrication of an exemplary optical element from a substrate.
Figure 15:
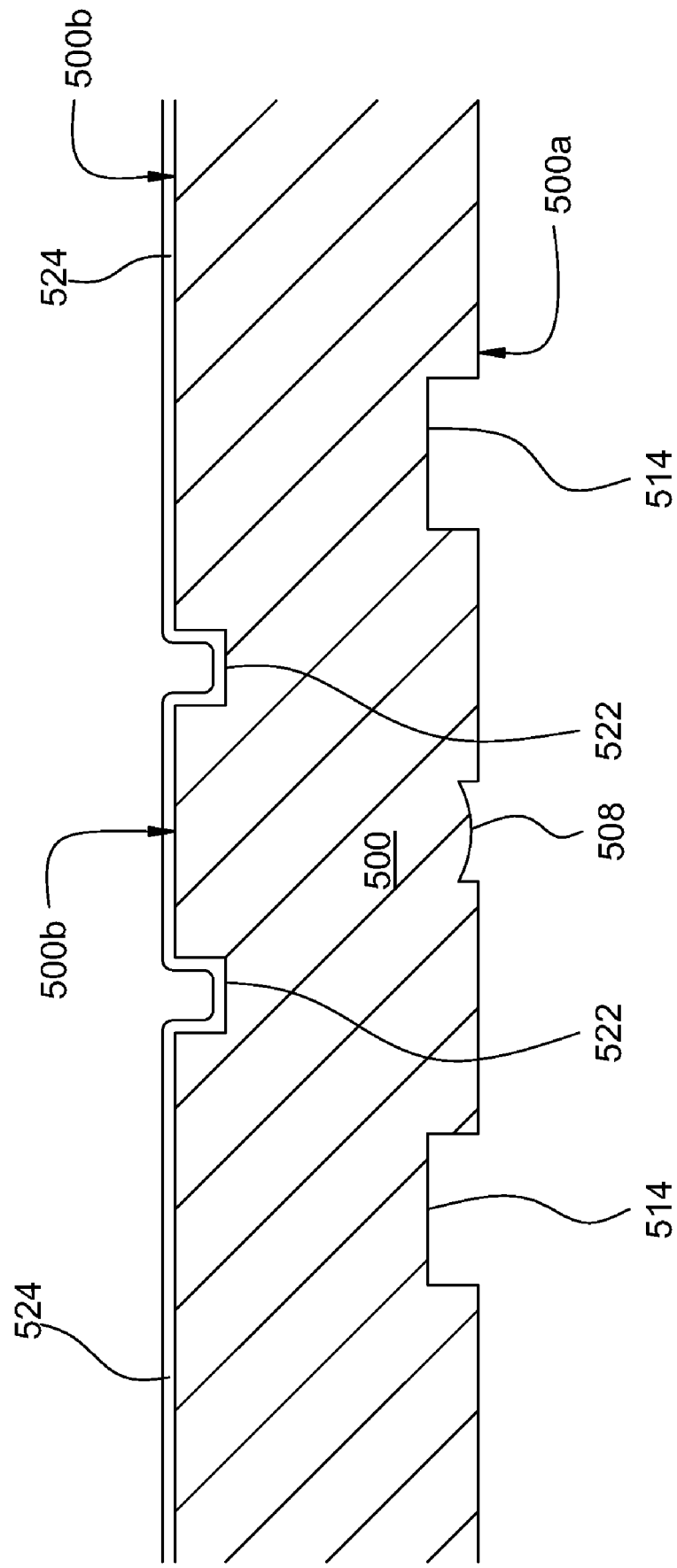
FIG. 15 illustrates schematically a cross-sectional view of fabrication of an exemplary optical element from a substrate.

FIGS. 14 (a view of the second wafer surface 500b) and 15 (a wafer cross section) schematically illustrate the formation of multiple areas circumscribed by trenches 522 and coated by optical coating 524 (of any desired or suitable type). The trenches 522 are suitably positioned relative to the areas 514 and lenses 508 formed on the opposite wafer surface 500a. The optical coating 524 can be of any suitable type to provide desired optical functionality on wafer surface 500b (e.g., reflective, anti-reflective, spectrally-selective, or dichroic).

Figure 17:
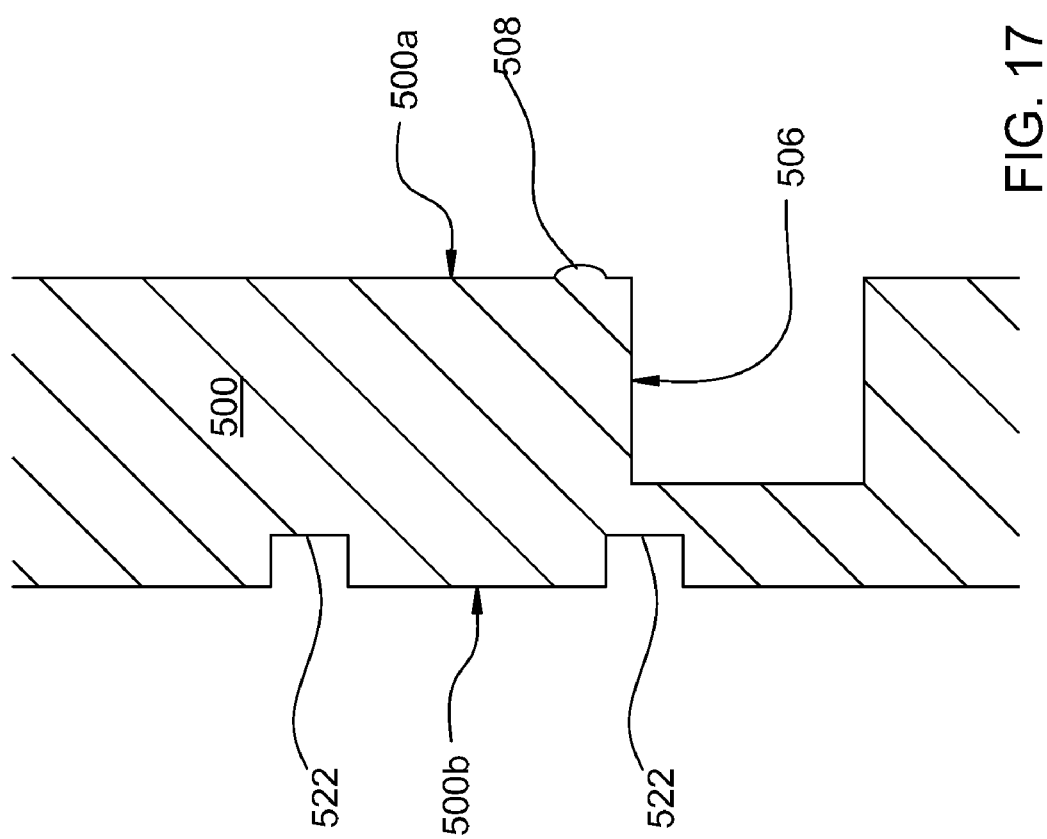
FIG. 17 illustrates schematically a cross-sectional view of fabrication of an exemplary optical element from a substrate.
Figure 19:
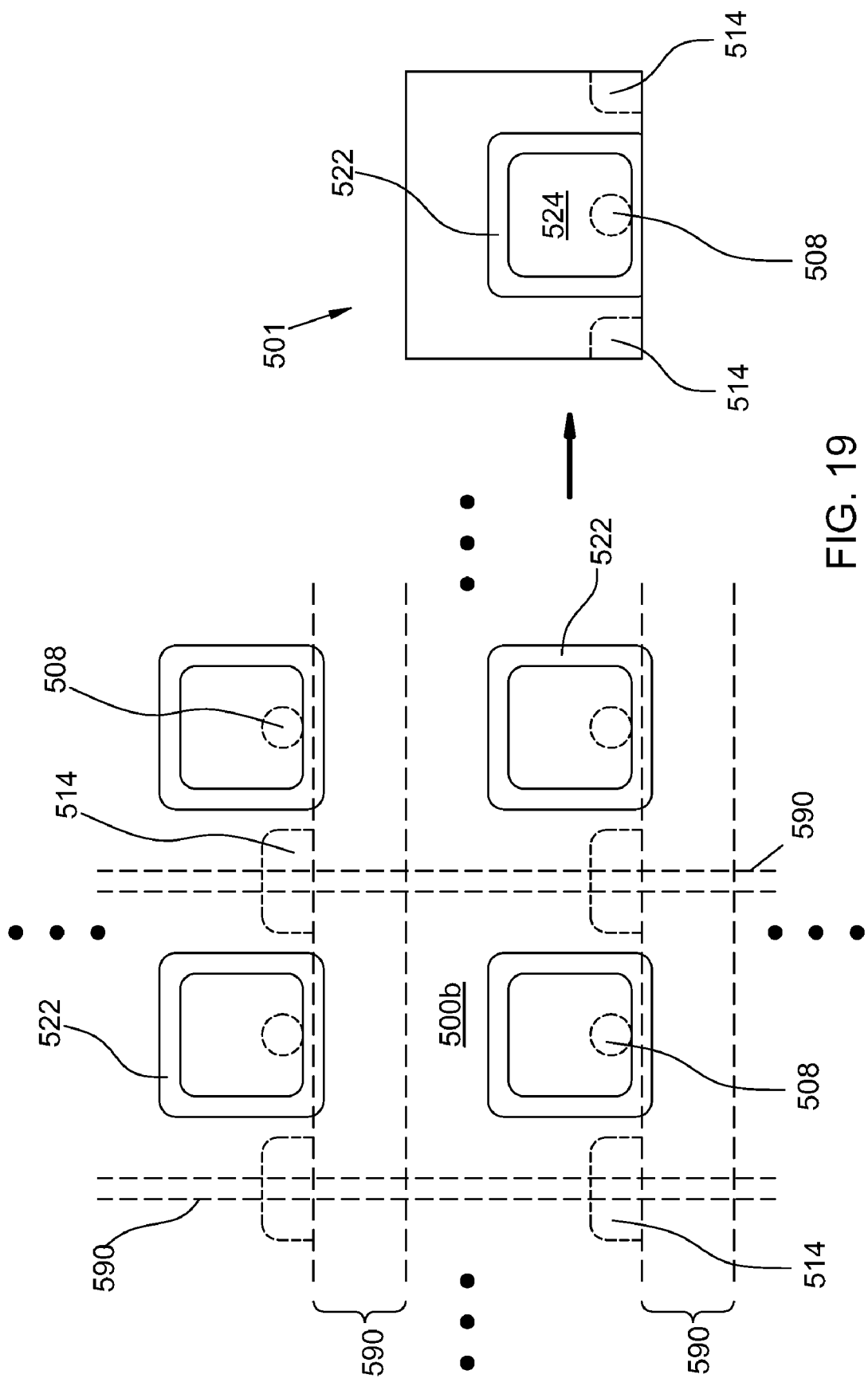
FIG. 19 illustrates schematically a top view of fabrication of multiple exemplary optical elements from a single substrate wafer.

Trenches 522 serve to limit fracturing of the coating 524, as described above; the alternative arrangements of FIGS. 21A-21F can be employed. In FIGS. 16 and 17, trenches are shown formed (by dry or wet etching or other suitable spatially-selective material processing, as described previously) on surface 500a to form mounting surfaces 506, suitably positioned relative to lenses 508 and recessed areas 514. For example, a masked, anisotropic wet etch process can be employed so that the resulting mounting surfaces 506 are parallel to a crystal plane of the wafer 500. In another example, beam etching (e.g., ion beam etching) of any suitable type can be employed to form mounting surfaces 506 at a desired angle relative to the substrate surface 500a. The mounting surfaces 506 are often oriented substantially perpendicular to the substrate surface 500a (resulting in transmission surfaces substantially perpendicular to the mounting surface in the finished optical element), but this need not be the case if a different relative orientation is needed or desired.

Figure 18:
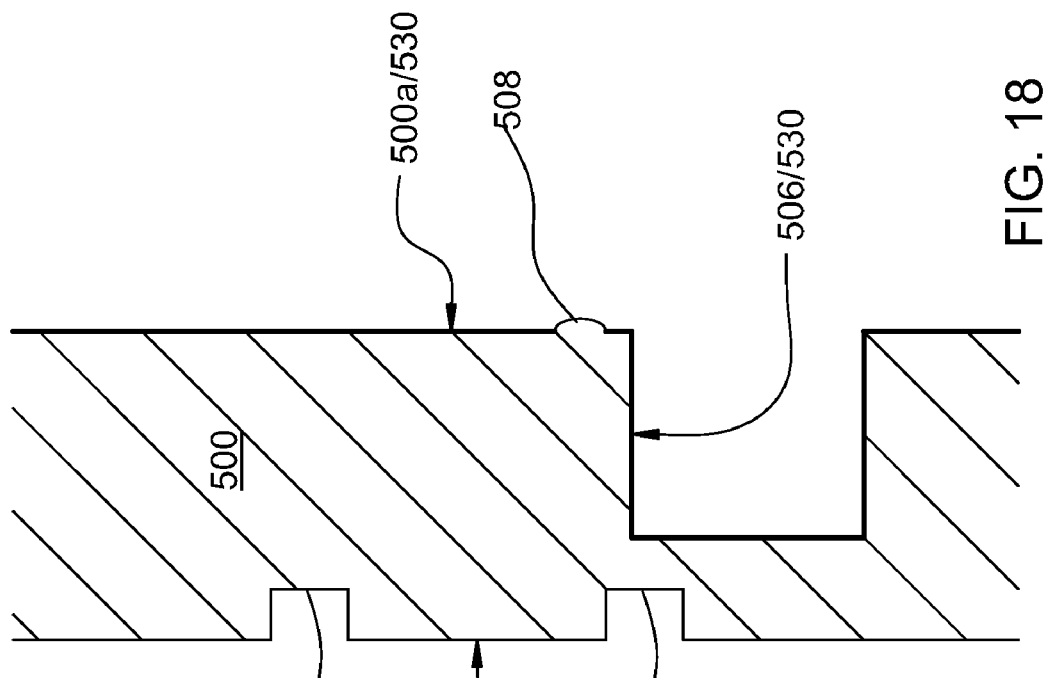
FIG. 18 illustrates schematically a cross-sectional view of fabrication of an exemplary optical element from a substrate.

FIG. 18 (a cross-sectional view of wafer 500) illustrates schematically a substantially opaque coating 530 spatially-selectively deposited on wafer surface 500a, which covers the bottom and edges of the recessed areas 514 and mounting surface 506. The coating 530 can be deposited directly on the semiconductor, or on an oxide or other dielectric layer deposited or grown or formed on wafer surface 500a, and can comprise any suitable coating as described above. Openings are formed in the coating 530 that leave the lenses 508 at least partly exposed, as described previously. The coating 530 can serve to reduce the amount of stray light transmitted through the finished optical element, as described above. The portion of coating 530 extending onto the mounting surfaces 506 to facilitate mounting of the optical element onto a waveguide substrate, e.g., by soldering or tacking onto metal members or coatings on the waveguide substrate. Edges of the metal layer 530 comprise visible alignment marks 510 having locations determined by the bottom or edges of the etched depressions 514.

After processing the first and second wafer surfaces, the wafer 500 is divided (i.e., singulated; e.g., by saw cuts 590 as in FIG. 19) into individual optical elements 501, each having transmission surface area 524, mounting surface 506, lens 508, and alignment marks 510 (FIGS. 20A-20D). The individual optical elements 501 can be separated (i.e., singulated) by any suitable method, including but not limited to cleaving the wafer or cutting the wafer (using a saw, laser, or other cutting tool). Recessed areas 514 are arranged so as to intersect cuts 590 (or cleavage planes) separating one optical element from another, thereby exposing edges of the previously-deposited metal layer 530. The exposed edges form an alignment feature 510 on the optical element 501 for facilitating proper positioning of the optical element on a waveguide substrate or other substrate surface. As described previously, a protruding portion or ridge 507 typically will be left adjacent the mounting surface 506 by whatever procedure is employed to separate the individual optical elements. The presence of ridge 507 would interfere with proper positioning of the optical element 501 on a flat mounting surface, e.g., on a waveguide substrate. A groove, slot, or pocket is typically formed on the waveguide substrate adjacent a flat mounting portion thereof to accommodate ridge 507 and allow proper engagement of the mounting surface 506 with a substantially flat substrate.

The respective embodiments formed by the processes of FIGS. 3-10 or FIGS. 13-19 differ in the placement of the alignment features 410 or 510 relative to the coated surfaces 424/524 or lenses 408/508. The alignment feature 410 is on the same side of optical element 401 as the transmission surface with the optical coating 424, and on the opposite side of element 410 from the mounting surface 406 and the lens 408. The alignment feature 510 is on the same side of optical element 501 as the mounting surface 506 and the lens 508, and on the opposite side of element 501 from the transmission surface with the optical coating 524. Which of those arrangements is preferable in a given situation can be determined by a variety of factors, including ease or cost of fabrication, visibility of the alignment features in the finished optical element, tolerance requirements for placement on the waveguide substrate of the coated surface versus the lens. Relative placement of structures formed on the same side of the wafer is not subject to uncertainties in the thickness of the wafer. In instances wherein placement of the coated surface relative to the waveguides has the tighter tolerance, the arrangement of optical element 410 might be preferred, if available, practicable, or sufficiently readily or economically fabricated (all other factors being equal). In instances wherein placement of the lens relative to the waveguides has the tighter tolerance, the arrangement of optical element 501 might be preferred (all other factors being equal).

The specific ordering of steps in the exemplary process of FIGS. 3-10 or 13-19 can be varied, and processes having those steps performed in differing orders shall fall within the scope of the present disclosure or appended claims.

Both exemplary processes (FIGS. 3-10 or FIGS. 13-19) enable simultaneous, wafer-scale fabrication of multiple optical elements on a single wafer during a single fabrication sequence. Hundreds, thousands, or tens of thousands of optical elements can be fabricated simultaneously, depending on the relative sizes of the wafer and the finished optical elements. Wafer-scale coating of multiple optical elements enables significant economies of scale to be realized. Wafer-scale testing or characterization can also be performed on the optical elements before they are separated from one another (e.g., between FIGS. 9 and 10, or between FIGS. 18 and 19).

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising", "including", and "having" shall be construed as open ended terminology, with the same meaning as if the phrase "at least" were appended after each instance thereof.

What is claimed is:

1. An optical apparatus comprising:
   (a) a waveguide substrate having at least one substrate alignment mark;
   (b) a first optical waveguide formed on the waveguide substrate;
   (c) an optical element mounted on the waveguide substrate, the optical element comprising a volume of substantially transparent material having opposing first and second transmission surfaces, a substantially flat mounting surface arranged between the transmission surfaces, at least one element alignment mark, and an optical coating on the first transmission surface; and
   (d) a photodetector mounted on the waveguide substrate, or a second optical waveguide formed on the waveguide substrate, wherein:
   the optical element is mounted on the waveguide substrate with the substantially flat mounting surface on a substantially flat mating portion of the substrate surface, the mounting surface being arranged so that the optical element is self-supporting on the substrate surface;
   the optical element is arranged and positioned, with the element alignment mark substantially aligned with the substrate alignment mark, so as to position the first and second transmission surfaces at respective orientations relative to the substrate surface and the first waveguide so that a portion of an optical signal emerging as an optical beam from an end face of the first optical waveguide enters the optical element through the first transmission surface, propagates as an optical beam through the optical element with the mounting surface between the optical beam and the substrate surface, and exits the optical element as an optical beam through the second transmission surface without being internally reflected within the optical element; and
   the photodetector or the second optical waveguide is positioned so as to receive directly the portion of the optical signal propagating as the optical beam exiting the optical element through the second transmission surface.

2. The apparatus of claim 1 further comprising an additional optical waveguide formed on the waveguide substrate, wherein the optical element is arranged and positioned, with the element alignment mark substantially aligned with the substrate alignment mark, so as to position the first transmission surface at an orientation relative to the substrate surface and relative to the first optical waveguide and the additional optical waveguide so as to optically end-couple the first and additional optical waveguides by external reflection from the first transmission surface.

3. The apparatus of claim 2 wherein the optical element further comprises a lens formed on the second transmission surface, the lens comprising (i) a curved portion of the second transmission surface, (ii) a Fresnel lens formed on the second transmission surface, or (iii) an index-gradient lens formed at the second transmission surface, the lens being arranged and positioned so that the optical beam transmitted through the second transmission surface passes through the lens.

4. The apparatus of claim 2 wherein the optical element further comprises an aperture on the second transmission surface, the aperture comprising an opening in a substantially opaque coating on the second transmission surface, the aperture being arranged and positioned so that the optical beam transmitted through the second transmission surface passes through the aperture.

5. The apparatus of claim 4 wherein the substantially opaque coating includes at least one metal layer.

6. The apparatus of claim 2 wherein:
   the optical element further comprises a lens formed on the second transmission surface, the lens comprising a curved portion of the second transmission surface, the lens being arranged and positioned so that the optical beam transmitted through the second transmission surface passes through the lens;
   the optical element further comprises an aperture on the second transmission surface, the aperture comprising an opening in a substantially opaque coating on the second transmission surface, the aperture being arranged and positioned so that the optical beam transmitted through the second transmission surface passes through the aperture;

at least a portion of the lens is exposed by the aperture; and the substantially opaque coating includes at least one metal layer.

7. The apparatus of claim 2 wherein the element alignment mark comprises an exposed edge of a metal layer on the optical element or a metal-coated surface formed on the optical element.

8. The apparatus of claim 2 wherein the optical coating comprises a dichroic optical coating or a spectrally-selective filter coating.

9. The apparatus of claim 2 wherein the optical element comprises semiconductor material.

10. The apparatus of claim 9 wherein at least one of the transmission surfaces or the mounting surface is substantially parallel to a corresponding crystal plane of the semiconductor material.

11. A method for forming optical elements comprising:
  (i) spatially-selectively processing a first surface of a wafer to define multiple alignment features;
  (ii) spatially-selectively processing the first or a second surface of the wafer to define multiple substantially flat mounting surfaces, the second wafer surface being substantially parallel to the first wafer surface, the multiple mounting surfaces forming an angle with the second wafer surface;
  (iii) forming an optical coating on the first wafer surface or on the second wafer surface; and
  (iv) dividing the wafer into individual optical elements, each optical element having a first transmission surface including a portion of the first wafer surface, a second transmission surface including a portion of the second wafer surface, a portion of at least one of the alignment features that forms an element alignment mark, at least one of the substantially flat mounting surfaces arranged between the first and second transmission surfaces, and at least a portion of the optical coating,
wherein, for each optical element;
the mounting surface is arranged so that the optical element is self-supporting on a substantially flat mating portion of a waveguide substrate surface; and
the first transmission surface, the second transmission surface, and the mounting surface are arranged so as to position, with the element alignment mark substantially aligned with a corresponding substrate alignment mark on the waveguide substrate, the first and second transmission surfaces at respective orientations relative to the mating portion of the substrate surface, so that an optical beam propagating substantially parallel to the substrate surface and entering the optical element through the first transmission surface propagates as an optical beam through the optical element with the mounting surface between the optical beam and the substrate surface and exits the optical element through the second transmission surface without being internally reflected within the optical element.

12. The method of claim 11 wherein, for each optical element, the first transmission surface, the second transmission surface, and the mounting surface are arranged so as to position, with the element alignment mark substantially aligned with a corresponding substrate alignment mark on the waveguide substrate, the first transmission surface at an orientation relative to the substrate surface and relative to first and second waveguides thereon so as to optically end-couple the first and second optical waveguides by external reflection from the first transmission surface.

13. The method of claim 12 wherein:
defining the alignment features comprises (i) spatially-selectively processing the first wafer surface to form multiple surfaces on the first wafer surface that are not parallel to the first wafer surface and (ii) depositing a metal layer onto the multiple surfaces; and
each element alignment mark comprises (i) an edge of the metal layer exposed by dividing the wafer into the individual optical elements or (ii) one of the multiple metal-coated surfaces.

14. The method of claim 12 wherein the optical coating comprises a dichroic optical coating or a spectrally-selective filter coating.

15. The method of claim 14 further comprising spatially-selectively processing the first or second wafer surface, prior to forming the optical coating on that surface, to form multiple circumscribed transmission regions that are vertically displaced from immediately adjacent portions of the wafer surface, wherein each optical element includes, after division from the wafer, an entire one of the circumscribed transmission regions.

16. The method of claim 15 wherein the multiple circumscribed transmission regions comprise multiple plateaus formed on the wafer surface or multiple recessed regions formed in the wafer surface.

17. The method of claim 15 wherein the multiple circumscribed transmission regions comprise multiple distinct areas of the wafer surface each surrounded by a corresponding trench formed in the wafer surface.

18. The method of claim 12 further comprising forming multiple curved portions on at least one of the wafer surfaces, each of the curved portions being arranged to act as a lens on the corresponding transmission surface of the corresponding optical element, the lens being arranged and positioned so that the optical beam transmitted through the second transmission surface passes through the lens.

19. The method of claim 18 further comprising forming a substantially opaque coating on the wafer surface with the curved portions, the opaque coating having multiple openings therethrough positioned so that at least part of each curved portion of the wafer surface is exposed by a corresponding one of the openings.

20. The method of claim 19 wherein the substantially opaque coating includes at least one metal layer.

21. The method of claim 12 further comprising forming a substantially opaque coating on one of the wafer surfaces, the opaque coating having multiple openings therethrough positioned so as to act as an aperture on the corresponding transmission surface of the corresponding optical element, the aperture being arranged and positioned so that the optical beam transmitted through the second transmission surface passes through the aperture.

22. The method of claim 21 wherein the substantially opaque coating includes at least one metal layer.

23. The method of claim 12 wherein the wafer comprises a semiconductor wafer.

24. The method of claim 23 wherein the wafer surfaces or the mounting surfaces coincide with a corresponding crystal plane of the semiconductor wafer.

25. A method comprising mounting an optical element on a waveguide substrate having a first optical waveguide formed thereon and at least one substrate alignment mark, the waveguide substrate also having a second optical waveguide formed thereon or a photodetector mounted thereon, wherein;

the optical element comprises a volume of substantially transparent material having opposing first and second transmission surfaces, a substantially flat mounting surface arranged between the transmission surfaces, at least one element alignment mark, and an optical coating on the first transmission surface;

the optical element is mounted on the waveguide substrate with the mounting surface on a substantially flat mating portion of the substrate surface, the mounting surface being arranged so that the optical element is self-supporting on the substrate surface;

the optical element is arranged and positioned, with the element alignment mark substantially aligned with the substrate alignment mark, so as to position the first and second transmission surfaces at respective orientations relative to the substrate surface and to the waveguide so that a portion of an optical signal emerging as an optical beam from an end face of the first optical waveguide enters the optical element through the first transmission surface, propagates as an optical beam through the optical element with the mounting surface between the optical beam and the substrate surface, and exits the optical element as an optical beam through the second transmission surface without being internally reflected within the optical element; and the photodetector or the second optical waveguide is positioned so as to receive directly the portion of the optical signal propagating as the optical beam exiting the optical element through the second transmission surface.

26. The method of claim 25 wherein:

the waveguide substrate has an additional optical waveguide formed thereon; and the optical element is arranged and positioned, with the element alignment mark substantially aligned with the substrate alignment mark, so as to position the first transmission surface at an orientation relative to the substrate surface and to the first optical waveguide and the additional optical waveguide so as to optically end-couple the first and additional optical waveguides by external reflection from the first transmission surface.

27. The method of claim 26 wherein the optical element further comprises a lens formed on the second transmission surface, the lens comprising (i) a curved portion of the second transmission surface, (ii) a Fresnel lens formed on the second transmission surface, or (iii) an index-gradient lens formed at the second transmission surface, the lens being arranged and positioned so that the optical beam transmitted through the second transmission surface passes through the lens.

28. The method of claim 26 wherein the optical element further comprises an aperture on the second transmission surface, the aperture comprising an opening in a substantially opaque coating on the second transmission surface, the aperture being arranged and positioned so that the optical beam transmitted through the second transmission surface passes through the aperture.

29. The method of claim 28 wherein the substantially opaque coating includes at least one metal layer.

30. The method of claim 26 wherein;

the optical element further comprises a lens formed on the second transmission surface, the lens comprising a curved portion of the second transmission surface, the lens being arranged and positioned so that the optical beam transmitted through the second transmission surface passes through the lens;

the optical element further comprises an aperture on the second transmission surface, the aperture comprising an opening in a substantially opaque coating on the second transmission surface, the aperture being arranged and positioned so that the optical beam transmitted through the second transmission surface passes through the aperture;

at least a portion of the lens is exposed by the aperture; and the substantially opaque coating includes at least one metal layer.

31. The method of claim 26 wherein the element alignment mark comprises an exposed edge of a metal layer on the optical element or a metal-coated surface formed on the optical element.

32. The method of claim 26 wherein the optical coating comprises a dichroic optical coating or a spectrally-selective filter coating.

33. The method of claim 26 wherein the optical element comprises semiconductor material.

34. The method of claim 33 wherein at least one of the transmission surfaces or the mounting surface is substantially parallel to a corresponding crystal plane of the semiconductor material.

* * * * *